(12) United States Patent
Jung et al.

(10) Patent No.: US 12,108,091 B2
(45) Date of Patent: Oct. 1, 2024

(54) MEDIA DATA PROCESSING METHOD, APPARATUS AND SYSTEM

(71) Applicant: ZTE CORPORATION, Guangdong (CN)

(72) Inventors: Cheolkon Jung, Guangdong (CN); Qiaozhou Lin, Guangdong (CN); Shengtao Yu, Guangdong (CN); Ming Li, Guangdong (CN); Guoqiang Shang, Guangdong (CN); Zhao Wu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 603 days.

(21) Appl. No.: 17/493,759

(22) Filed: Oct. 4, 2021

(65) Prior Publication Data

US 2022/0030283 A1    Jan. 27, 2022

Related U.S. Application Data

(63) Continuation-in-part of application No. 16/301,929, filed as application No. PCT/CN2017/076335 on Mar. 10, 2017, now Pat. No. 11,165,944.

(30) Foreign Application Priority Data

May 16, 2016    (CN) .......................... 201610325310.X

(51) Int. Cl.
*H04N 19/98*    (2014.01)
*H04N 5/57*    (2006.01)
(Continued)

(52) U.S. Cl.
CPC ............... *H04N 19/98* (2014.11); *H04N 5/57* (2013.01); *H04N 19/124* (2014.11); *H04N 19/172* (2014.11); *H04N 19/70* (2014.11)

(58) Field of Classification Search
CPC ..................................................... H04N 19/98
(Continued)

(56) References Cited

U.S. PATENT DOCUMENTS

2012/0230429 A1\* 9/2012 Boyce .................... H04N 19/85
                                                    375/E7.026
2015/0170340 A1    6/2015 Sato et al.
(Continued)

FOREIGN PATENT DOCUMENTS

CN    103136929 A    6/2013
CN    204168311 U    2/2015
(Continued)

OTHER PUBLICATIONS

European Patent Office, EP17798530.6 Extended European Search Report issued on Jul. 17, 2019.
(Continued)

*Primary Examiner* — Yulin Sun
(74) *Attorney, Agent, or Firm* — Li & Cai Intellectual Property (USA) Office

(57) ABSTRACT

Provided in embodiments of the present disclosure are a media data processing method, an apparatus and a system. The method comprises: obtaining an optical signal of a sampling point by a collection device at the source end in an acquisition of media data; acquiring an optical signal intensity of the optical signal of the sampling point and a display brightness of a display device at destination end; determining an opto-electronic transfer control parameter according to the optical signal intensity of the optical signal of the sampling point and the display brightness; performing opto-electronic transfer on the optical signal of the sampling point according to the opto-electronic transfer control parameter to obtain a transferred electrical signal; and encoding the
(Continued)

electrical signal and the opto-electronic transfer control parameter to obtain a bitstream.

20 Claims, 3 Drawing Sheets

(51) Int. Cl.
    *H04N 19/124*     (2014.01)
    *H04N 19/172*     (2014.01)
    *H04N 19/70*     (2014.01)

(58) Field of Classification Search
    USPC ................................................ 375/240.02
    See application file for complete search history.

(56) References Cited

U.S. PATENT DOCUMENTS

| | | | | |
|---|---|---|---|---|
| 2015/0245050 A1* | 8/2015 | Tourapis | .......... | H04N 21/42202 |
| | | | | 375/240.02 |
| 2017/0085827 A1* | 3/2017 | Terada | ..................... | H04N 9/87 |
| 2019/0116349 A1* | 4/2019 | Thompson | ............... | H04N 9/77 |

FOREIGN PATENT DOCUMENTS

| | | |
|---|---|---|
| CN | 104813666 A | 7/2015 |
| CN | 105393525 A | 3/2016 |
| CN | 105474624 A | 4/2016 |
| WO | WO 2015130797 A1 | 9/2015 |
| WO | WO 2015190246 A1 | 12/2015 |

OTHER PUBLICATIONS

Cotton, et al. "BBC's response to CfE for HDR Video Coding (Category 3a)", MPEG meeting, issued on Jun. 18, 2015.
Hattori, et al., "HLS: SEI message for Knee Function Information", JCT-VC Meeting, issued on Dec. 31, 2013.
European Patent Office, EP17798530.6, the partial supplementary European Search Report issued on Apr. 8, 2019.
China Patent Office, CN201610325310.X First Office Action (OA1) issued on May 25, 2020.
WIPO, International Search Report issued on May 23, 2017 and the English Translation of the ISR.

* cited by examiner

MEDIA DATA PROCESSING METHOD, APPARATUS AND SYSTEM

CROSS REFERENCE TO RELATED APPLICATIONS

The present application is a continuation of U.S. patent application Ser. No. 16/301,929, filed on Nov. 15, 2018, which is based upon and claims benefit of Chinese Patent Application No. 201610325310.X, filed on May 16, 2016, the contents of these applications are hereby incorporated by reference in their entirety.

TECHNICAL FIELD

Embodiments of the present disclosure relate to the field of communication, and in particular, to a media data processing method, apparatus and system.

BACKGROUND

Traditional Standard Dynamic Range (SDR) media data (such as videos or images) can only reflect a limited range of brightness. High Dynamic Range (HDR) media data (such as videos or images) can reflect wider brightness range, greatly expand the contrast and enrich the color so that real scenes can be displayed more realistically.

HDR images and videos are stored as floating-point data. It takes more storage space and bandwidth to store and transmit HDR videos. Therefore, it is necessary to develop an efficient HDR video coding technology. The existing HDR video coding technology is mainly divided into two types, i.e. backward compatible video coding technology and video coding technology based on human perception. The backward compatible video coding technique maps a HDR image to a SDR one, making it possible to be backward compatible with and support traditional devices with bit depths of 8 bits. The video coding technology based on human perception mainly utilizes a visual model of a human eye to accurately describe a masking effect of the human eye in the HDR image and to eliminate information that has less influence on the human eye perception, thereby saving the encoding bits. Based on the above two types of technology, an HDR video coding scheme based on human eye perception and backward compatibility is proposed, in which the HDR opto-electronic transfer operation is completed with a Hybrid Log Gamma (HLG) transfer function.

However, the above method of converting by using the HLG transfer function is only based on the highest light emission luminance and ambient luminance of the display device, so that there may be a problem that the display brightness is too high in displaying media data (such as HDR videos or images). That is, processing media data using such a method may cause a problem that the processing may be not sufficiently accurate. Moreover, the logarithmic operation involved in the HLG conversion function is complicated, which greatly increases the complexity of processing the media data on the sink.

SUMMARY

The embodiments of the present disclosure provide a method, a device and a system for processing media data, to at least solve the problem of low accuracy in processing media data in the related art.

According to one embodiment of the present disclosure, there is provided a method for processing media data, including: obtaining an optical signal of a sampling point by a collection device at the source end in an acquisition of media data; performing opto-electronic transfer on the optical signal of the sampling point according to an opto-electronic transfer control parameter to obtain a transferred electrical signal, the opto-electronic transfer control parameter being determined according to an optical signal intensity of the optical signal of the sampling point; and encoding the electrical signal and the opto-electronic transfer control parameter to obtain a bitstream.

Optionally, performing opto-electronic transfer on the optical signal of the sampling point according to an opto-electronic transfer control parameter to obtain a transferred electrical signal includes: determining whether the optical signal intensity of the optical signal of the sampling point is greater than a predetermined threshold; and when the optical signal intensity of the optical signal of the sampling point is greater than the predetermined threshold, performing opto-electronic transfer on the optical signal intensity of the optical signal of the sampling point according to the opto-electronic transfer control parameter, to obtain an electrical signal intensity of the electrical signal corresponding to the optical signal intensity of the optical signal of the sampling point.

Optionally, performing opto-electronic transfer on the optical signal intensity of the optical signal of the sampling point according to the opto-electronic transfer control parameter, to obtain an electrical signal intensity of an electrical signal corresponding to the optical signal intensity of the optical signal of the sampling point, includes:

$$E' = a \frac{p(E-b)}{p(E-b) - (E-b) + E_{max}},$$

where, $E$ denotes the electrical signal intensity of the electrical signal corresponding to the optical signal intensity of the optical signal of the sampling point; $E$ denotes the optical signal intensity of the optical signal of the sampling point; $p$ denotes the opto-electronic transfer control parameter; $E_{max}$ denotes the maximum brightness of the reference point; $a$ and $b$ denote preset control parameters.

Optionally, before performing opto-electronic transfer on the optical signal of the sampling point according to the opto-electronic transfer control parameter, the method further includes: acquiring an optical signal intensity of the optical signal of the sampling point and a display brightness of the display device at destination end; and determining the opto-electronic transfer control parameter according to the optical signal intensity of the optical signal of the sampling point and the display brightness.

Optionally, acquiring an optical signal intensity of the optical signal of the sampling point and a display brightness of the display device at destination end includes: acquiring the maximum optical signal intensity and the minimum optical signal intensity of the optical signal intensities of the obtained optical signals of the sampling points; and acquiring the maximum brightness and the minimum brightness of the display device at destination end.

Optionally, determining the opto-electronic transfer control parameter according to the optical signal intensity of the optical signal of the sampling point and the display brightness includes:

$$p = \frac{M}{N} \cdot \frac{H}{L},$$

where, p denotes the opto-electronic transfer control parameter; M denotes the maximum brightness of the display device at destination end; N denotes the minimum brightness of the display device at destination end; H denotes the maximum optical signal intensity; and L denotes the minimum optical signal intensity.

Optionally, acquiring the maximum optical signal intensity and the minimum optical signal intensity of the optical signal intensities of the obtained optical signal of the sampling point includes at least one of: acquiring, among the optical signal intensities of the collected optical signals of the sampling points in one picture, the maximum optical signal intensity and the minimum optical signal intensity, and acquiring, among the optical signal intensities of the collected optical signal of the sampling point in a plurality of pictures, the maximum optical signal intensity and the minimum optical signal intensity.

Optionally, acquiring the maximum brightness and the minimum brightness of the display device at destination end includes at least one of: acquiring the maximum brightness and the minimum brightness preset for the display device at destination end, and acquiring the maximum brightness and the minimum brightness achieved by the display device at destination end through communication with the destination end.

Optionally, encoding the electrical signal and the opto-electronic transfer control parameter to obtain a bitstream includes: encoding a quantized value obtained by quantizing the electrical signal intensity of the electrical signal; encoding the opto-electronic transfer control parameter; and writing bits obtained by encoding the quantized value and the opto-electronic transfer control parameter into the bitstream.

Optionally, writing bits obtained by encoding the opto-electronic transfer control parameter into the bitstream includes at least one of: writing the bits obtained by encoding the opto-electronic transfer control parameter into a parameter set data unit of the bitstream; writing the bits obtained by encoding the opto-electronic transfer control parameter into a supplemental enhancement information data unit of the bitstream; and writing the bits obtained by encoding the opto-electronic transfer control parameter into a system layer data unit of the bitstream.

Optionally, writing the bits obtained by encoding the opto-electronic transfer control parameter into a system layer data unit of the bitstream includes: writing the bits obtained by encoding the opto-electronic transfer control parameter into a file format data unit and/or a descriptor unit in the system layer data unit.

Optionally, after writing the bits obtained by encoding the opto-electronic transfer control parameter into the bitstream, the method further includes: establishing an association relationship between the data unit in the bitstream in which the bits obtained by encoding the opto-electronic transfer control parameter are written and an access unit in the bitstream.

Optionally, establishing an association relationship between the data unit in the bitstream in which the bits obtained by encoding the opto-electronic transfer control parameter are written and an access unit in the bitstream includes at least one of: referencing to a parameter set data unit in the access unit; writing the supplementary enhanced information data unit into the access unit; and associating the system layer data unit with the access unit.

Optionally, associating the system layer data unit with the access unit includes: indicating the access unit associated with the system layer data unit with a pointer parameter; and writing the system layer data unit into header information of the system layer data unit where the access unit is located.

According to yet another embodiment of the present disclosure, there is provided a media data processing apparatus, including: a first acquiring unit configured to obtain an optical signal of a sampling point by a collection device at the source end in an acquisition of media data; a transfer unit configured to perform opto-electronic transfer on the optical signal of the sampling point according to an opto-electronic transfer control parameter to obtain a transferred electrical signal, the opto-electronic transfer control parameter being determined according to an optical signal intensity of the optical signal of the sampling point; and an encoding unit configured to encode the electrical signal and the opto-electronic transfer control parameter to obtain a bitstream.

According to yet another embodiment of the present disclosure, there is provided a system for processing media data including: a source-side collecting device configured to obtain an optical signal of a sampling point by a collection device at the source end in an acquisition of media data; perform opto-electronic transfer on the optical signal of the sampling point according to an opto-electronic transfer control parameter, to obtain a transferred electrical signal, the opto-electronic transfer control parameter being determined according to an optical signal intensity of the optical signal of the sampling point; and encode the electrical signal and the opto-electronic transfer control parameter to obtain a bitstream; and a display device at destination end, configured to parse a bitstream, and acquire an electrical signal to be processed and an electro-optical transfer control parameter; perform electro-optical transfer on the electrical signal according to the electro-optical transfer control parameter, to obtain an optical signal intensity of the transferred optical signal; and control the display device at destination end to display according to the optical signal intensity of the optical signal.

According to yet another embodiment of the present disclosure, there is provided a storage medium. The storage medium may be configured to store program codes for performing the following steps: obtaining an optical signal of a sampling point by a collection device at the source end in an acquisition of media data; performing opto-electronic transfer on the optical signal of the sampling point according to an opto-electronic transfer control parameter to obtain a transferred electrical signal, the opto-electronic transfer control parameter being determined according to an optical signal intensity of the optical signal of the sampling point; and encoding the electrical signal and the opto-electronic transfer control parameter to obtain a bitstream.

Optionally, the storage medium is further configured to store program codes for performing the following steps: determining whether the optical signal intensity of the optical signal of the sampling point is greater than a predetermined threshold; when the optical signal intensity of the optical signal of the sampling point is greater than the predetermined threshold, performing opto-electronic transfer on the optical signal intensity of the optical signal of the sampling point according to the opto-electronic transfer control parameter, to obtain an electrical signal intensity of the electrical signal corresponding to the optical signal intensity of the optical signal of the sampling point.

Optionally, the storage medium is further configured to store program codes for performing the following steps:

$$E' = a\frac{p(E-b)}{p(E-b)-(E-b)+E_{max}},$$

where, E' denotes the electrical signal intensity of the electrical signal corresponding to the optical signal intensity of the optical signal of the sampling point; E denotes the optical signal intensity of the optical signal of the sampling point; p denotes the opto-electronic transfer control parameter; $E_{max}$ denotes the maximum brightness of the reference point; a and b denote preset control parameters.

According to the embodiments of the present disclosure, the optical signal of the sampling point which is obtained during collection of the media data is acquired, and opto-electronic transfer is performed on the optical signal of the sampling point according to the opto-electronic transfer control parameter to obtain the transferred electrical signal. The opto-electronic transfer control parameter is determined according to an optical signal intensity of the optical signal of the sampling point. Further, the electrical signal and the opto-electronic transfer control parameter are encoded to obtain a bitstream. That is, by encoding the opto-electronic transfer control parameter determined according to the optical signal intensity of the optical signal of the sampling point into the bitstream, it can adaptively adjust the opto-electronic transfer control parameter for performing opto-electronic transfer in consideration of the optical signal intensity. Thus, it can adaptively adjust the conversion curves for the collected media data (such as videos or images) with optical signals of the sampling points in different light intensity regions. It can effectively maintain details information of the media data before and after the opto-electronic transfer, so as to achieve the effect of improving the accuracy in conversion and processing of the media data, and overcome the problem in the related art that the since the opto-electronic transfer is merely based on the brightness of the display device and the brightness of the ambient light, the accuracy of processing media data is low.

BRIEF DESCRIPTION OF THE DRAWINGS

The drawings are intended to provide a further understanding of the present disclosure, and are intended to be a part of the present disclosure. The illustrative embodiments of the present disclosure and the description thereof are provided for explaining the present disclosure and do not constitute an undue limitation of the present disclosure. In the drawing.

DETAILED DESCRIPTION

The present disclosure will be described in detail below with reference to the drawings in conjunction with the embodiments. It should be noted that the embodiments in the present application and the features in the embodiments may be combined with each other without conflict.

It should be noted that the terms "first", "second", and the like in the specification and claims of the present disclosure are used to distinguish similar objects, and are not necessarily used to describe a particular order or sequence.

First Embodiment

Figure 1:
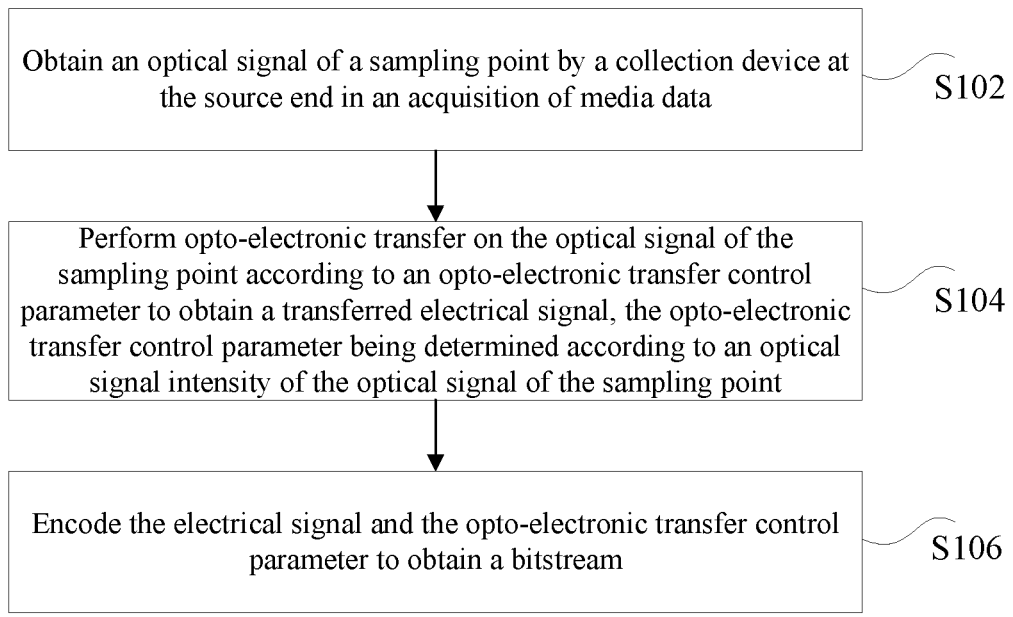
FIG. 1 is a flow chart of an alternative method for processing media data according to an embodiment of the present disclosure.

A method for processing media data is provided in the embodiment. FIG. 1 is a flow chart of a method for processing media data according to an embodiment of the present disclosure. As shown in FIG. 1, the method includes the steps as follows.

In S102, an optical signal of a sampling point obtained by a collection device at the source end in an acquisition of media data is acquired.

In S104, opto-electronic transfer is performed on the optical signal of the sampling point according to an opto-electronic transfer control parameter, to obtain a transferred electrical signal, and the opto-electronic transfer control parameter is determined according to an optical signal intensity of the optical signal of the sampling point.

In S106, the electrical signal and the opto-electronic transfer control parameter are encoded to obtain a bitstream.

Figure 2:
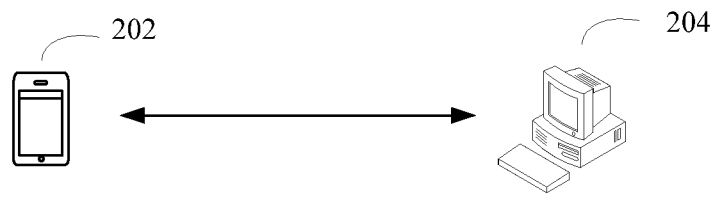
FIG. 2 is a schematic diagram of an alternative system for processing media data according to an embodiment of the present disclosure.

Optionally, in the embodiment, the method for processing media data may be, but not limited to, applied to a system for processing media data. The system includes: a source-side collecting device and a display device at destination end. Taking a video communication application as an example, the above mentioned device may be, but not limited to, a related code-stream generating device and a receiving-playing device in a video communication application, such as, a mobile phone, a computer, a server, a set top box, a portable mobile terminal, a digital camera, a television broadcasting system device, etc. It is assumed that the code-stream generating device (source-side collecting device) shown in FIG. 2 may be a mobile phone 202, and the receiving-playing device (the display device at destination end) may be a computer 204. The above is only an example, and is not limited in the embodiment.

It should be noted that, in the embodiment, the source-side collecting device acquires the optical signal of the sampling point which is obtained during collection of the media data, and performs opto-electronic transfer on the optical signal of the sampling point according to the opto-electronic transfer control parameter to obtain the transferred electrical signal. The opto-electronic transfer control parameter is determined according to an optical signal intensity of the optical signal of the sampling point. Further, the electrical signal and the opto-electronic transfer control parameter are encoded to obtain a bitstream. That is, by encoding the opto-electronic transfer control parameter determined according to the optical signal intensity of the optical signal of the sampling point into the bitstream, it can adaptively adjust the opto-electronic transfer control parameter for performing opto-electronic transfer in consideration of the optical signal intensity. Thus, it can adaptively adjust the conversion curves for the collected media data (such as videos or images) with optical signals of the sampling points in different light intensity regions. It can effectively maintain details information of the media data before and after the opto-electronic transfer, so as to achieve the effect of improving the accuracy in conversion and processing of the media data, and overcome the problem in the related art that the since the opto-electronic transfer is merely based on the brightness of the display device and the brightness of the ambient light, the accuracy of processing media data is low.

Optionally, in the embodiment, obtaining an optical signal of a sampling point by a collection device at the source end in an acquisition of media data may be but not limited to: acquiring the optical signal intensity of the optical signal of the sampling point collected by the source-side collecting device. The optical signal intensity of the optical signal of the sampling point may be, but not limited to, represented by a voltage value in proportional to the light intensity of the light collected by the source-side collecting device. The optical signal intensity of the optical signal of the above sampling point may be, but not limited to, normalized with respect to a reference level (e.g., a reference white level).

It should be noted that the process of acquiring the voltage value may be, but not limited to, the same as the process of acquiring the voltage value E in the related art (the scheme using the HLG conversion parameter), which will not be described herein in the embodiment.

Optionally, in the embodiment, performing opto-electronic transfer on the optical signal of the sampling point according to an opto-electronic transfer control parameter, to obtain a transferred electrical signal includes the following steps.

In S1, it is determined whether the optical signal intensity of the optical signal of the sampling point is greater than a predetermined threshold.

In S2, when the optical signal intensity of the optical signal of the sampling point is greater than the predetermined threshold, opto-electronic transfer is performed on the optical signal intensity of the optical signal of the sampling point according to the opto-electronic transfer control parameter, to obtain an electrical signal intensity of the electrical signal corresponding to the optical signal intensity of the optical signal of the sampling point.

It should be noted that, in the embodiment, when the optical signal intensity of the optical signal of the sampling point is greater than the predetermined threshold, the opto-electronic transfer control parameter associated with the optical signal intensity of the optical signal of the sampling point is introduced. Thus, the brightness range feature of the sampling point is taken into consideration in the opto-electronic transfer process. In this way, when the media data is converted, the conversion curve can be dynamically adaptively adjusted with different brightness range features, thereby achieving an accurate conversion effect on the media data.

Optionally, in the embodiment, performing opto-electronic transfer on the optical signal intensity of the optical signal of the sampling point according to the opto-electronic transfer control parameter, to obtain an electrical signal intensity of an electrical signal corresponding to the optical signal intensity of the optical signal of the sampling point, may follow the equation:

$$E' = a \frac{p(E-b)}{p(E-b) - (E-b) + E_{max}} \quad (1)$$

Where, E' denotes the electrical signal intensity of the electrical signal corresponding to the optical signal intensity of the optical signal of the sampling point; E denotes the optical signal intensity of the optical signal of the sampling point; p denotes the opto-electronic transfer control parameter; $E_{max}$ denotes the maximum brightness of the reference point; a and b denote preset control parameters.

That is to say, in the opto-electronic transfer process at the source side, an opto-electronic transfer function (such as formula (1)) is determined using a rational function curve having a similar characteristic to a logarithmic mapping curve. The opto-electronic transfer function includes the above opto-electronic transfer control parameter p. Opto-electronic transfer is performed on the optical signal of the sampling point having the optical signal intensity through the opto-electronic transfer function containing the above opto-electronic transfer control parameter p, to obtain an electrical signal with a corresponding electrical signal intensity. The electrical signal intensity of the electrical signal obtained herein can accurately reflect the details information of the media data in different light intensity regions, thereby achieving the effect of improving the accuracy of the media data conversion processing. In addition, in the embodiment, the opto-electronic transfer function may be a rational function. Compared with complex logarithmic and exponential operation required when using the HLG conversion function in the related art, performing opto-electronic transfer through a rational function can greatly reduce the overall computational complexity of the conversion process, and can also achieve the effect of improving the accuracy of data processing.

In addition, when the optical signal intensity of the optical signal of the sampling point is less than or equal to a predetermined threshold, the opto-electronic transfer may be performed with, but not limited to, the opto-electronic transfer mode provided in the related art (e.g. the scheme using the HLG conversion parameter):

$$E' = r\sqrt{E} \quad (2)$$

Where r is a reference value. Optionally, the value of r may be, but not limited to, set to 0.5 at the source side.

Optionally, in the embodiment, before performing opto-electronic transfer on the optical signal of the sampling point according to the opto-electronic transfer control parameter, the method further includes: an optical signal intensity of the optical signal of the sampling point and a display brightness of the display device at destination end are acquired; and the opto-electronic transfer control parameter is determined according to the optical signal intensity of the optical signal of the sampling point and the display brightness.

Optionally, in the embodiment, determining the opto-electronic transfer control parameter according to the optical signal intensity of the optical signal of the sampling point and the display brightness may be, but not limited to, determining the opto-electronic transfer control parameter according to the maximum optical signal intensity and the minimum optical signal intensity of the optical signal intensities of the obtained optical signal of the sampling point and the maximum brightness and the minimum brightness displayed by the display device at destination end.

For example, the opto-electronic transfer control parameter may be calculated by:

$$p = \frac{M}{N} \cdot \frac{H}{L} \quad (3)$$

Where, p denotes the opto-electronic transfer control parameter; M denotes the maximum brightness of the display device at destination end; N denotes the minimum brightness of the display device at destination end; H denotes the maximum optical signal intensity; and L denotes the minimum optical signal intensity.

Optionally, in the embodiment, the maximum optical signal intensity and the minimum optical signal intensity may be, but are not limited to, among the optical signal intensities of the obtained optical signals of the sampling points in one picture, the maximum optical signal intensity and the minimum optical signal intensity in one image, or the maximum optical signal intensity and the minimum optical signal intensity in a plurality of images.

Optionally, in the embodiment, the maximum brightness and the minimum brightness of the display device at destination end may be, but are not limited to, the maximum brightness and the minimum brightness preset for the display device at destination end, or the maximum brightness and the minimum brightness achieved by the display device at destination end, which are acquired by the source side through communication with the destination end.

Optionally, in the embodiment, encoding the electrical signal and the opto-electronic transfer control parameter to obtain a bitstream includes the following steps.

In S1, a quantized value obtained by quantizing the electrical signal intensity of the electrical signal is encoded.

In S2, the opto-electronic transfer control parameter is encoded.

In S3, the quantified result and the bits obtained by encoding the opto-electronic transfer control parameter are written into the bitstream.

Writing the bits obtained by encoding the opto-electronic transfer control parameter into the bitstream include at least one of the following:
1) writing the bits obtained by encoding the opto-electronic transfer control parameter into a parameter set data unit of the bitstream;
2) writing the bits obtained by encoding the opto-electronic transfer control parameter into a supplemental enhancement information data unit of the bitstream; and
3) writing the bits obtained by encoding the opto-electronic transfer control parameter into a system layer data unit of the bitstream.

It should be noted that the above system layer data unit includes: a file format data unit and a descriptor unit. Writing the bits obtained by encoding the opto-electronic transfer control parameter into a system layer data unit of the bitstream may include: writing the bits obtained by encoding the opto-electronic transfer control parameter into a file format data unit and/or a descriptor unit in the system layer data unit.

Optionally, in the embodiment, after the bits obtained by encoding the opto-electronic transfer control parameter are written into the bitstream, the method further includes: establishing an association relationship between the data unit in the bitstream in which the bits obtained by encoding the opto-electronic transfer control parameter are written and an access unit in the bitstream.

In the embodiment, establishing an association relationship between the data unit in the bitstream in which the bits obtained by encoding the opto-electronic transfer control parameter are written and an access unit in the bitstream includes at least one of the following:
1) referencing to a parameter set data unit in the access unit;
2) writing the supplementary enhanced information data unit into the access unit; and
3) associating the system layer data unit with the access unit.

It should be noted that, in the above manner 3), associating the system layer data unit with the access unit includes at least one of the following: (1) indicating the access unit associated with the system layer data unit with a pointer parameter; and (2) writing the system layer data unit into header information of the system layer data unit where the access unit is located.

According to the embodiment provided by the present application, the collected optical signal of the sampling point is acquired, and opto-electronic transfer is performed on the optical signal of the sampling point according to the opto-electronic transfer control parameter to obtain the transferred electrical signal. The opto-electronic transfer control parameter is determined according to an optical signal intensity of the optical signal of the sampling point. Further, the electrical signal and the opto-electronic transfer control parameter are encoded to obtain a bitstream. That is, by encoding the opto-electronic transfer control parameter determined according to the optical signal intensity of the optical signal of the sampling point into the bitstream, it can adaptively adjust the opto-electronic transfer control parameter for performing opto-electronic transfer in consideration of the optical signal intensity. Thus, it can adaptively adjust the conversion curves for the collected media data (such as videos or images) with optical signals of the sampling points in different light intensity regions. It can effectively maintain details information of the media data before and after the opto-electronic transfer, so as to achieve the effect of improving the accuracy in conversion and processing of the media data, and overcome the problem in the related art that the since the opto-electronic transfer is merely based on the brightness of the display device and the brightness of the ambient light, the accuracy of processing media data is low.

As an optional solution, performing opto-electronic transfer on the optical signal of the sampling point according to an opto-electronic transfer control parameter to obtain a transferred electrical signal includes the following steps.

In S1, it is determined whether the optical signal intensity of the optical signal of the sampling point is greater than a predetermined threshold.

In S2, when the optical signal intensity of the optical signal of the sampling point is greater than the predetermined threshold, opto-electronic transfer is performed on the optical signal intensity of the optical signal of the sampling point according to the opto-electronic transfer control parameter, to obtain an electrical signal intensity of the electrical signal corresponding to the optical signal intensity of the optical signal of the sampling point.

Optionally, in the embodiment, the optical signal intensity of the optical signal of the sampling point may be, but not limited to, represented by a voltage value E in proportional to the light intensity collected by the source-side collecting device. That is to say, the voltage value E is in proportional to the light intensity received on the sensor on the collecting device, and is a result normalized with respect to a reference level (e.g., a reference white level).

Optionally, in the embodiment, if the predetermined threshold is 1, when the optical signal intensity E of the optical signal of the sampling point is greater than 1, performing opto-electronic transfer on the optical signal intensity of the optical signal of the sampling point according to the opto-electronic transfer control parameter, to obtain an electrical signal intensity of an electrical signal corresponding to the optical signal intensity of the optical signal of the sampling point may include:

$$E' = a \frac{p(E-b)}{p(E-b) - (E-b) + E_{max}} \quad (4)$$

Where, E' denotes the electrical signal intensity of the electrical signal corresponding to the optical signal intensity of the optical signal of the sampling point; E denotes the optical signal intensity of the optical signal of the sampling point; p denotes the opto-electronic transfer control parameter; $E_{max}$ denotes the maximum brightness of the reference point; a and b denote preset control parameters.

It should be noted that in the embodiment, the above Emax is also a voltage value, and the value of Emax may be, but not limited to, set to 12. The process of determining the value of Emax here may be, but not limited to, the same as the process in the related art (e.g. the scheme using the HLG conversion parameter), details of which are not described herein in the embodiment. In addition, in the embodiment, the values of the preset control parameters a and b may be, but are not limited to, 0.17883277 and 0.28466892, respectively.

Optionally, in the embodiment, if the predetermined threshold is 1, when the value of the optical signal intensity E of the optical signal of the sampling point is within the range [0, 1], the value of the electrical signal intensity may be, but not limited to, calculated by the following manner:

$$E'=r\sqrt{E} \quad (5)$$

Wherein r is a reference value. Optionally, the value of r may be set to 0.5 at the source side.

According to the embodiment provided by the present application, opto-electronic transfer is performed on the optical signal of the sampling point having the optical signal intensity through the opto-electronic transfer function containing the above opto-electronic transfer control parameter to obtain an electrical signal with a corresponding electrical signal intensity. The electrical signal intensity of the electrical signal obtained herein can accurately reflect the details information of the media data in different light intensity regions, thereby achieving the effect of improving the accuracy of the media data conversion processing.

As an optional solution, before performing opto-electronic transfer on the optical signal of the sampling point according to the opto-electronic transfer control parameter, the method further includes the following steps.

In S1, an optical signal intensity of the optical signal of the sampling point and a display brightness of the display device at destination end are acquired.

In S2, the opto-electronic transfer control parameter is determined according to the optical signal intensity of the optical signal of the sampling point and the display brightness.

Optionally, in the embodiment, acquiring an optical signal intensity of the optical signal of the sampling point and a display brightness of the display device at destination end includes the following steps.

In S12, the maximum optical signal intensity and the minimum optical signal intensity of the optical signal intensities of the obtained optical signal of the sampling point are acquired.

In S14, the maximum brightness and the minimum brightness displayed by the display device at destination end are acquired.

Optionally, in the embodiment, in step S12, acquiring the maximum optical signal intensity and the minimum optical signal intensity of the optical signal intensities of the obtained optical signal of the sampling point includes at least one of the following:

1) among the optical signal intensities of the obtained optical signals of the sampling points in one picture, acquiring the maximum optical signal intensity and the minimum optical signal intensity; and
2) among the optical signal intensities of the obtained optical signals of the sampling points in a plurality of pictures, acquiring the maximum optical signal intensity and the minimum optical signal intensity.

Optionally, in the embodiment, in step S14, acquiring the maximum brightness and the minimum brightness displayed by the display device at destination end includes at least one of the following:

1) acquiring the maximum brightness and the minimum brightness preset for the display device at destination end; and
2) acquiring the maximum brightness and the minimum brightness achieved by the display device at destination end, which are acquired through communication with the destination end.

Optionally, in the embodiment, determining the opto-electronic transfer control parameter according to the optical signal intensity of the sampling point and the display brightness includes:

$$p = \frac{M}{N} \cdot \frac{H}{L} \quad (6)$$

Where, p denotes the opto-electronic transfer control parameter; M denotes the maximum brightness of the display device at destination end; N denotes the minimum brightness of the display device at destination end; H denotes the maximum optical signal intensity; and L denotes the minimum optical signal intensity.

According to the embodiment provided by the present application, the opto-electronic transfer control parameter for opto-electronic transfer is determined according to the optical signal intensity of the sampling point collected by the collecting device. In this way, it can adaptively adjust the conversion curves for different light intensity regions according to the optical signal intensities of the sampling points in the collected media data. It can effectively reflect details information before and after the opto-electronic transfer, so as to ensure the accuracy in conversion and processing of the media data.

As an optional solution, encoding the electrical signal and the opto-electronic transfer control parameter to obtain a bitstream includes the following steps.

In S1, a quantized value obtained by quantizing the electrical signal intensity of the electrical signal is encoded.

In S2, the opto-electronic transfer control parameter is encoded.

In S3, the quantified result and the bits obtained by encoding the opto-electronic transfer control parameter are written into the bitstream.

Optionally, in the embodiment, writing the bits obtained by encoding the opto-electronic transfer control parameter into the bitstream include at least one of the following:

1) writing the bits obtained by encoding the opto-electronic transfer control parameter into a parameter set data unit of the bitstream;
2) writing the bits obtained by encoding the opto-electronic transfer control parameter into a supplemental enhancement information data unit of the bitstream; and
3) writing the bits obtained by encoding the opto-electronic transfer control parameter into a system layer data unit of the bitstream.

Optionally, in the embodiment, writing the bits obtained by encoding the opto-electronic transfer control parameter into a parameter set data unit of the bitstream includes: writing the bits obtained by encoding the opto-electronic transfer control parameter into a file format data unit and/or a descriptor unit in the system layer data unit.

According to the embodiment provided by the present application, the bits obtained by encoding the opto-electronic transfer control parameter are written into different data units in the bitstream, so that the destination end can accurately perform the corresponding electro-optical transfer process after parsing the bitstream.

As an optional solution, after the bits obtained by encoding the opto-electronic transfer control parameter are written into the bitstream, the method further includes the following steps.

In S1, an association relationship is established between the data unit in the bitstream in which the bits obtained by encoding the opto-electronic transfer control parameter are written and an access unit in the bitstream.

Optionally, in the embodiment, establishing an association relationship between the data unit in the bitstream in which the bits obtained by encoding the opto-electronic transfer control parameter are written and an access unit in the bitstream includes at least one of the following:

1) referencing to a parameter set data unit in the access unit;
2) writing the supplementary enhanced information data unit into the access unit; and
3) associating the system layer data unit with the access unit.

Optionally, in the embodiment, associating the system layer data unit with the access unit includes at least one of the following:

(1) indicating the access unit associated with the system layer data unit with a pointer parameter; or
(2) writing the system layer data unit into header information of the system layer data unit where the access unit is located.

According to the embodiment provided by the present application, an association relationship is established between the access unit and the data unit in the bitstream in which the bits obtained by encoding the opto-electronic transfer control parameter are written, it can further ensure that after the sink-side parsed the bitstream, it can accurately perform the corresponding electro-optical transfer process.

It will be illustrated below with an example in which it is assumed that the collected optical signal of the sampling point is an input signal, and the display device at destination end is a SDR display device. Then the method for processing media data may be performed by the source-side collecting device of the embodiment through the following steps.

In S1, a parameter of the sink-side SDR display device is determined.

The parameter of the SDR display device mainly includes the maximum brightness M and the minimum brightness N that the SDR display device can display. Optionally, in the embodiment, the parameter of the SDR device may be a set value common to the SDR device. Optionally, the source side can perform capability negotiation with the SDR display device to obtain the parameter of the SDR device.

In S2, the source side calculates the HDR conversion control parameter.

The source side obtains the maximum intensity Hival of the optical signal and the minimum intensity Loyal of the optical signal in the input signal.

Optionally, the source side may obtain the maximum intensity of the optical signal and the minimum intensity of the optical signal of each image in the input signal, respectively, and calculate an opto-electronic transfer control parameter. Optionally, the source side may also obtain the maximum intensity of the optical signal and the minimum intensity of the optical signal for a plurality of images in the input signal, and calculate the opto-electronic transfer control parameter.

Optionally, in the embodiment, the source side calculates the opto-electronic transfer control parameter according to the following calculation formula:

$$p = \frac{M}{N} \cdot \frac{Hival}{Loval} \qquad (7)$$

In S3, the source side calculates an intensity of an electrical signal corresponding to the intensity of the optical signal in the input signal.

It should be noted that the source side may go through the relevant steps in the HLG method to calculate the value E of the intensity of the optical signal in the input signal, which is normalized with respect to the reference white level. In addition, the source side may go through the relevant steps in the HLG method to determine the maximum brightness Emax relative to the reference white level. Where, Hival denotes the maximum intensity H of the optical signal, and Loyal denotes the minimum intensity L of the optical signal.

Optionally, in the embodiment, when the source side determines that the value of E is greater than 1, the intensity of the electrical signal corresponding to the intensity of the input optical signal may be calculated through the following formula of a rational mapping function:

$$E' = a \frac{p(E-b)}{p(E-b) - (E-b) + E_{max}} \qquad (8)$$

Optionally, in the embodiment, when the source side determines that the value of E is in the range [0, 1], the intensity of the electrical signal corresponding to the intensity of the input optical signal may be calculated through the following calculation formula:

$$E' = r\sqrt{E} \qquad (9)$$

Where, a and b denote preset control parameters, and their values are 0.17883277 and 0.28466892, respectively; and r denotes a reference value of the electrical signal. Optionally, the source side sets the value of r to 0.5.

In S4, the source side encodes the intensity of the electrical signal to obtain an encoded bitstream.

It should be noted that, in the embodiment, S4 is an optional step that the source side may choose to perform.

Optionally, in the embodiment, the source side may go through the relevant steps in the HLG method to quantify the intensity of the electrical signal to obtain a binary digitized representation value corresponding to the intensity of the electrical signal, that is, an HDR video or image. The source side encodes the HDR video or image with an associated encoder (such as an H.265/HEVC encoder) to obtain an encoded bitstream.

Optionally, in the embodiment, the source side encodes parameters in the above steps. In the embodiment, it is necessary to encode the opto-electronic transfer control parameter p, to obtain the bits obtained by encoding the opto-electronic transfer control parameter p, and write the bits obtained by encoding the opto-electronic transfer control parameter p into the bitstream.

Optionally, the source side writes the bits obtained by encoding the opto-electronic transfer control parameter p into the encoded bitstream of the HDR video or image. The source side writes the bits obtained by encoding the opto-electronic transfer control parameter p into a parameter set data unit in the encoded bitstream of the HDR video or image, and/or the source side writes the bits obtained by encoding the opto-electronic transfer control parameter p into a supplemental enhancement information data unit and attaches the data unit into the access unit of the HDR video or image.

Optionally, the source side writes the bits obtained by encoding the opto-electronic transfer control parameter p into a system layer data unit or a file format data unit of the HDR video or image. For example, the source side may write the bits obtained by encoding the opto-electronic transfer control parameter p into a descriptor unit, and associate the descriptor unit with the corresponding image unit or the access unit in the encoded bitstream of the HDR video or image.

From the description of the above embodiments, those skilled in the art can clearly understand that the method according to the above embodiment can be implemented by means of software in combination with a necessary general hardware platform, and of course, can also be implemented by means of hardware, but in many cases the former is a better implementation. Based on such understanding, the technical solution of the present disclosure in essence or the part which is contribution to the related art can be embodied in the form of a software product stored in a storage medium (such as ROM/RAM, magnetic disk, CD) and including a number of instructions for causing a terminal device (which may be a cell phone, a computer, a server, or a network device, etc.) to perform the methods described in various embodiments of the present disclosure.

Second Embodiment

Figure 3:
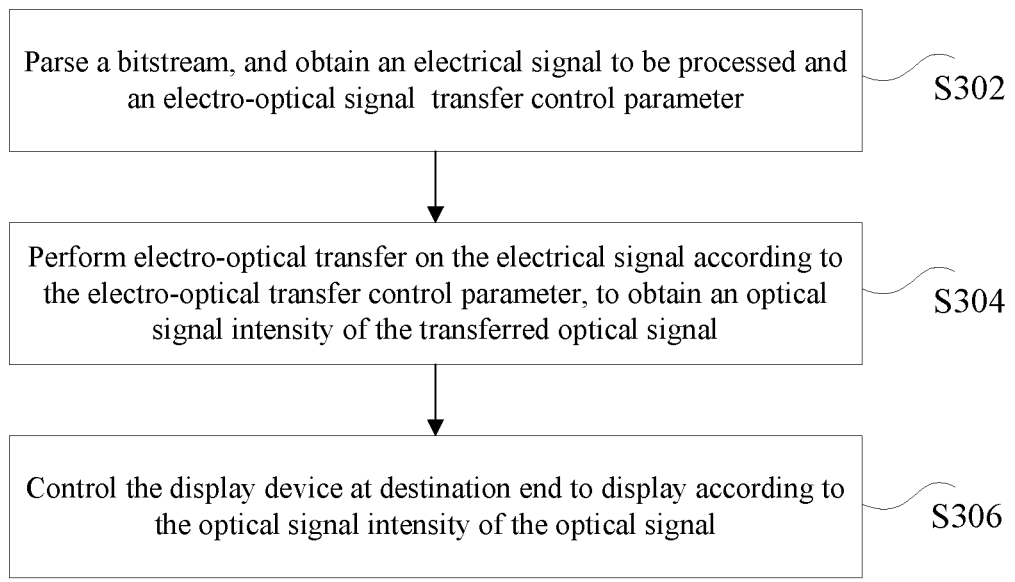
FIG. 3 is a flow chart of another alternative method for processing media data according to an embodiment of the present disclosure.

A method for processing media data is provided in the embodiment. FIG. 3 is a flow chart of a method for processing media data according to an embodiment of the present disclosure. As shown in FIG. 3, the method includes the following steps.

In S302, a bitstream is parsed, and an electrical signal to be processed and an electro-optical transfer control parameter are acquired.

In S304, electro-optical transfer is performed on the electrical signal according to the electro-optical transfer control parameter, to obtain an optical signal intensity of the transferred optical signal.

In S306, the display device at destination end is controlled to display according to the optical signal intensity of the optical signal.

Optionally, in the embodiment, the above method for processing media data may be, but not limited to, applied to a system for processing media data. The system includes: a source-side collecting device and a display device at destination end. Taking a video communication application as an example, the above mentioned device may be, but not limited to, a related code-stream generating device and a receiving-playing device in a video communication application, such as a mobile phone, a computer, a server, a set top box, a portable mobile terminal, a digital camera, a television broadcasting system device, etc. It is assumed that the code-stream generating device (source-side collecting device) shown in FIG. 2 may be a mobile phone 202, and the receiving-playing device (the display device at destination end) may be a computer 204. The above is only an example, and is not limited in the embodiment.

It should be noted that, in the embodiment, the display device at destination end parses the bitstream, acquires an electrical signal to be processed, and an electro-optical transfer control parameter; and performs electro-optical transfer on the electrical signal according to the electro-optical transfer control parameter to obtain an optical signal intensity of the transferred optical signal. Further, a display device at the destination end is controlled to display according to the optical signal intensity of the optical signal. That is to say, the bitstream is parsed at the destination end, and the electro-optical transfer control parameter for the electro-optical transfer process is obtained. Then electro-optical transfer is performed on the electric signal according to the electro-optical transfer control parameter to obtain the optical signal intensity of the transferred optical signal. By utilizing the electro-optical transfer control parameter corresponding to the opto-electronic transfer control parameter, it can adaptively adjust the conversion curves for the collected media data (such as videos or images) with optical signals of the sampling points in different light intensity regions. It can effectively maintain details information of the media data before and after the opto-electronic transfer, so as to achieve the effect of improving the accuracy in conversion and processing of the media data, and overcome the problem in the related art that the accuracy of processing media data is low.

Optionally, in the embodiment, performing electro-optical transfer on the electrical signal according to the electro-optical transfer control parameter, to obtain an optical signal intensity of the transferred optical signal, includes the following steps.

In S1, it is determined whether the electrical signal intensity of the electrical signal is greater than a predetermined threshold.

In S2, when the electrical signal intensity of the electrical signal is greater than the predetermined threshold, electro-optical transfer is performed on the electrical signal intensity of the electrical signal with the electro-optical transfer control parameter to obtain an optical signal intensity of the optical signal corresponding to the electrical signal intensity of the electrical signal.

It should be noted that, in the embodiment, when the electrical signal intensity of the electrical signal is greater than the predetermined threshold, the electro-optical transfer control parameter is introduced. Thus, the conversion curve may be adaptively adjusted dynamically with the change of the brightness range feature, thereby achieving an accurate conversion effect on the media data.

Optionally, in the embodiment, electro-optical transfer is performed on the electrical signal intensity of the electrical signal with the electro-optical transfer control parameter to obtain an optical signal intensity of the optical signal corresponding to the electrical signal intensity of the electrical signal includes:

$$E = \frac{E'(p \cdot b - b - E_{max}) - p \cdot a \cdot b}{E'(p-1) - p \cdot a} \quad (1)$$

Where, E denotes the optical signal intensity of the optical signal corresponding to the electrical signal intensity of the electrical signal; E' denotes the electrical signal intensity of the electrical signal; p denotes the electro-optical transfer control parameter; $E_{max}$ denotes the maximum brightness of the reference point; and a and b denotes preset control parameters.

That is to say, in the electro-optical transfer process at the destination end, an electric-optic conversion function (such as formula (1)) is determined using a rational function curve having a similar characteristic to a logarithmic mapping curve. The electric-optic conversion function includes the above electric-optic conversion control parameter p. Electric-optic conversion is performed with the above electric-optic conversion control parameter p, to obtain an optical signal with a corresponding optical signal intensity. The optical signal intensity of the optical signal obtained herein can accurately reflect the details information of the media data in different light intensity regions, thereby achieving the effect of improving the accuracy of the media data conversion processing. In addition, in the embodiment, the electric-optic conversion function may be a rational function, and compared with complex logarithmic and exponential operation required when using the HLG conversion function in the related art, performing electric-optic conversion through a rational function can greatly reduce the overall computational complexity of the conversion process, and can also achieve the effect of improving the accuracy of data processing.

In addition, when the electrical signal intensity of the electrical signal is less than or equal to a predetermined threshold, the opto-electronic transfer may be performed by an opto-electronic transfer method provided in the related art (a scheme using an HLG conversion parameter):

$$E=(E'/r)^2 \qquad (2)$$

Wherein r is a reference value. Optionally, the value of r may be set to 0.5 at the source side.

Optionally, in the embodiment, acquiring the electro-optical transfer control parameter includes at least one of the following:

1) acquiring the electro-optical transfer control parameter signalled in the bitstream;
2) acquiring the optical signal intensity of the optical signal carried in the electrical signal and the display brightness of the display device at destination end; and determining the electro-optical transfer control parameter according to the optical signal intensity of the optical signal carried in the electrical signal and the display brightness of the display device at destination end.

That is to say, in the embodiment, the opto-electronic transfer control parameter written into the bitstream can be directly obtained as the electro-optical transfer control parameter, and the electro-optical transfer control parameter can also be determined according to the optical signal intensity of the optical signal carried in the electrical signal and the device display of the display device at destination end.

Optionally, in the embodiment, acquiring the electro-optical transfer control parameter signalled in the bitstream includes at least one of the following:

1) acquiring the electro-optical transfer control parameter signalled in the parameter set data unit in the bitstream;
2) acquiring the electro-optical transfer control parameter signalled in the supplementary enhancement information data unit in the bitstream;
3) acquiring the electro-optical transfer control parameter signalled in the system layer data unit in the bitstream.

It should be noted that, in the embodiment, the electro-optical transfer control parameter signalled in the supplementary enhancement information data unit overwrites the electro-optical transfer control parameter signalled in the parameter set data unit and/or the electro-optical transfer control parameter signalled in the system layer data unit. The electro-optical transfer control parameter signalled in the parameter set data unit overwrites the electro-optical transfer control parameter signalled in the system layer data unit.

Optionally, in the embodiment, S1, acquiring the optical signal intensity of the optical signal carried in the electrical signal and the display brightness of the display device at destination end includes: S12, acquiring the maximum optical signal intensity and the minimum optical signal intensity carried in the electrical signal; and acquiring the maximum brightness and the minimum brightness of the display device at destination end. S2, determining the electro-optical transfer control parameter according to the optical signal intensity of the optical signal carried in the electrical signal and the display brightness of the display device at destination end includes:

$$p = \frac{M}{N} \cdot \frac{H}{L} \qquad (3)$$

Where, p denotes the electro-optical transfer control parameter; M denotes the maximum brightness of the display device at destination end; N denotes the minimum brightness of the display device at destination end; H denotes the maximum optical signal intensity; and L denotes the minimum optical signal intensity.

Optionally, in the embodiment, before the display device at destination end is controlled to display according to the optical signal intensity of the optical signal, the method further includes: S1, performing gamma correction on the optical signal.

According to the embodiment provided by the present application, the bitstream is parsed, the electrical signal to be processed and the electro-optical transfer control parameter are acquired; and electro-optical transfer is performed on the electrical signal according to the electro-optical transfer control parameter, to obtain an optical signal intensity of the transferred optical signal. Further, a display device at the destination end is controlled to display according to the optical signal intensity of the optical signal. That is to say, the bitstream is parsed at the destination end, and the electro-optical transfer control parameter for the electro-optical transfer process is acquired. Then electro-optical transfer is performed on the electric signal according to the electro-optical transfer control parameter to obtain the optical signal intensity of the transferred optical signal. By utilizing the electro-optical transfer control parameter corresponding to the opto-electronic transfer control parameter, it can adaptively adjust the conversion curves for the collected media data (such as videos or images) with optical signals of the sampling points in different light intensity regions. It can effectively maintain details information of the media data before and after the opto-electronic transfer, so as to achieve the effect of improving the accuracy in conversion and processing of the media data, and overcome the problem in the related art that the accuracy of processing media data is low.

As an optional solution, performing electro-optical transfer on the electrical signal according to the electro-optical transfer control parameter, to obtain an optical signal intensity of the transferred optical signal, includes the following steps.

In S1, it is determined whether the electrical signal intensity of the electrical signal is greater than a predetermined threshold.

In S2, when the electrical signal intensity of the electrical signal is greater than the predetermined threshold, electro-optical transfer is performed on the electrical signal intensity of the electrical signal with the electro-optical transfer control parameter to obtain an optical signal intensity of the optical signal corresponding to the electrical signal intensity of the electrical signal.

Optionally, in the embodiment, it is assumed that the predetermined threshold is r, and the value of r at the destination end may be set to 0.5. Then, when the electrical signal intensity E' of the electrical signal is greater than r (r=0.5), electro-optical transfer is performed on the electrical signal intensity of the electrical signal with the electro-optical transfer control parameter, to obtain the optical signal intensity of the optical signal corresponding to the electrical signal intensity of the electrical signal:

$$E = \frac{E'(p \cdot b - b - E_{max}) - p \cdot a \cdot b}{E'(p-1) - p \cdot a} \quad (4)$$

Where, E denotes the optical signal intensity of the optical signal corresponding to the electrical signal intensity of the electrical signal; E' denotes the electrical signal intensity of the electrical signal; p denotes the electro-optical transfer control parameter; $E_{max}$ denotes the maximum brightness of the reference point; a and b denotes preset control parameters.

It should be noted that in the embodiment, the above Emax is also a voltage value, and the value of Emax may be, but not limited to, set to 12. The process of determining the value of Emax here may be, but not limited to, the same as the process in the related art (the scheme using the HLG conversion parameter), details of which will not be described herein in the embodiment. In addition, in the embodiment, the values of the preset control parameters a and b may be, but are not limited to, 0.17883277 and 0.28466892, respectively.

Optionally, in the embodiment, it is assumed that the predetermined threshold is r, and the value of r at the destination end may be set to 0.5. Then, when the electrical signal intensity E' of the electrical signal is less than or equal to r (r=0.5), the corresponding optical signal intensity may be calculated by:

$$E = (E'/r)^2 \quad (5)$$

According to the embodiment provided by the present application, electro-optical transfer is performed on the electrical signal intensity through an electro-optical transfer function including the electro-optical transfer control parameter to obtain an optical signal intensity of the corresponding optical signal. The optical signal intensity of the optical signal obtained herein can accurately reflect the details information of the media data in different light intensity regions, thereby achieving the effect of improving the accuracy of the media data conversion processing.

As an optional solution, acquiring the electro-optical transfer control parameter includes at least one of the following:

1) acquiring the electro-optical transfer control parameter signalled in the bitstream;
2) acquiring the optical signal intensity of the optical signal carried in the electrical signal and the display brightness of the display device at destination end; and determining the electro-optical transfer control parameter according to the optical signal intensity of the optical signal carried in the electrical signal and the display brightness of the display device at destination end Optionally, in the embodiment, acquiring the electro-optical transfer control parameter signalled in the bitstream includes at least one of the following:

(1) acquiring the electro-optical transfer control parameter signalled in the parameter set data unit in the bitstream;
(2) acquiring an electro-optical transfer control parameter signalled in the supplementary enhancement information data unit in the bitstream;
(3) acquiring the electro-optical transfer control parameter signalled in the system layer data unit in the bitstream.

Optionally, in the embodiment, the electro-optical transfer control parameter signalled in the supplementary enhancement information data unit overwrites the electro-optical transfer control parameter signalled in the parameter set data unit and/or the electro-optical transfer control parameter signalled in the system layer data unit. The electro-optical transfer control parameter signalled in the parameter set data unit overwrites the electro-optical transfer control parameter signalled in the system layer data unit.

Optionally, in the embodiment, acquiring the optical signal intensity of the optical signal carried in the electrical signal and the display brightness of the display device at destination end includes: acquiring the maximum optical signal intensity and the minimum optical signal intensity carried in the electrical signal; and acquiring the maximum brightness and the minimum brightness of the display device at destination end. Further, in the embodiment, determining the electro-optical transfer control parameter according to the optical signal intensity of the optical signal carried in the electrical signal and the display brightness of the display device at destination end includes:

$$p = \frac{M}{N} \cdot \frac{H}{L} \quad (6)$$

Where, p denotes the electro-optical transfer control parameter; M denotes the maximum brightness of the display device at destination end; N denotes the minimum brightness of the display device at destination end; H denotes the maximum optical signal intensity; and L denotes the minimum optical signal intensity.

According to the embodiment provided by the present application, the electro-optical transfer control parameter obtained after parsing the bitstream is used in the electro-optical transfer process, and the conversion curve of the different light intensity regions can be adaptively adjusted, so that the conversion process can accurately reflect the details of the information before and after the conversion, and, in turn, ensure the accuracy of the media data conversion process.

As an optional solution, before the display device at destination end is controlled to display according to the optical signal intensity of the optical signal, the method further includes:

S1, performing gamma correction on the optical signal intensity of the optical signal.

According to the embodiment provided by the present application, the optical signal intensity of the optical signal is gamma corrected, and the accuracy of the result after the conversion of the media data can be further ensured.

It will be illustrated below with an example in which it is assumed that the display device at destination end is a SDR display device. Then, the display device at destination end in the embodiment performs the method for processing media data through the following steps.

In S1, display device at destination end acquires the electro-optical transfer control parameter.

Wherein, as an optical implementation for the destination end to acquire the electro-optical transfer control parameter, the destination end parses the received bitstream (such as a bit stream containing an HDR video or image), and acquires the electro-optical transfer control parameter p.

The destination end parses a bitstream (such as a bit stream containing an HDR video or image) in a system layer data unit (a file format data unit or a descriptor unit), and acquires the electro-optical transfer control parameter p. For example, the destination end parses the descriptor unit, acquires the electro-optical transfer control parameter p, and sets the electro-optical transfer control parameter p as the control parameter used in the electro-optical transfer process of the HDR image contained in the access unit or in the image unit in the bitstream of the HDR video or image corresponding to the descriptor unit.

Optionally, the destination end parses the parameter set data unit in the parsed bitstream (such as the bit stream containing the HDR video or image), acquires the electro-optical transfer control parameter p, and sets the electro-optical transfer control parameter p as the control parameter used in the electro-optical transfer process of the image referring to the parameter set.

Optionally, the destination end parses the supplementary enhancement information data unit in the bitstream (such as the bit stream containing the HDR video or image), acquires the electro-optical transfer control parameter p, and sets the electro-optical transfer control parameter p as the control parameter used in the electro-optical transfer process of the image contained in the access unit where the supplementary enhancement information is stored.

Optionally, when the destination end parses the system layer data unit (file format data unit or descriptor unit) where the bitstream (such as the bit stream containing the HDR video or image) is located (denoted as the electro-optical transfer control parameter p1), parses the parameter set data unit (denoted as the electro-optical transfer control parameter p2) and/or supplementary enhancement information data unit (denoted as the electro-optical transfer control parameter p3) in the bitstream (such as the bit stream containing the HDR video or image), to acquire a plurality of electro-optical transfer control parameters. If the electro-optical transfer control parameter p3 can be acquired, the destination end set the electro-optical transfer control parameter p to p3. Otherwise, the destination end set the electro-optical transfer control parameter p to p2.

Optionally, in the embodiment, as another alternative implementation for the destination end to acquire the electro-optical transfer control parameter, the destination end calculates the electro-optical transfer parameter p according to known information. For example, the electro-optical transfer control parameter may be determined according to the optical signal intensity of the optical signal carried in the electrical signal and the display brightness of the display device at destination end.

The maximum brightness M and the minimum brightness N that can be displayed by the SDR display device set by the destination end are acquired, and an alternative approach for setting the above parameter may include: if the destination end includes the SDR display device, the destination end setting the maximum brightness that the SDR display device can display to M, and sets the minimum brightness that the SDR display device can display to N; otherwise, the destination end setting the parameters M and N respectively to the maximum brightness and the minimum brightness that a general SDR display device can display. An alternative approach for setting the above parameter is: the destination end setting the parameters M and N respectively to the maximum brightness and the minimum brightness that a general SDR display device can display.

Optionally, in the embodiment, the destination end determines the maximum optical signal intensity Hival (also referred to as the maximum optical signal intensity H) and the minimum light optical signal intensity Loyal (also referred to as the maximum optical signal intensity L) of the sampling point contained in the HDR video or image to be displayed which is carried in the electrical signal. For example, the destination end acquires the maximum optical signal intensity Hival and the minimum light optical signal intensity Loyal by parsing the received bitstream (such as a bit stream containing an HDR video or image).

The destination end calculates the electro-optical transfer control parameter through the following formula:

$$p = \frac{M}{N} \cdot \frac{Hival}{Loval} \quad (7)$$

In S2, the destination end acquires the electrical signal intensity of the sample point in the HDR video or image.

Optionally, in the embodiment, the destination end maps the sampled value of the sampling point in the input HDR video or image to the electrical signal intensity through relevant HLG method.

Optionally, if the destination end includes a decoder (such as an H.265/HEVC decoder), the destination end decodes the encoded HDR video or image bitstream as received to obtain a sampled value of the sample point.

In S3, the destination end converts the electrical signal intensity of the sampling point in the HDR video or image into the optical signal intensity of the display device.

Optionally, in the embodiment, the destination end determines that when the electrical signal intensity E' is greater than the parameter r, the electrical signal intensity E corresponding to the input optical signal may be calculated through the following formula:

$$E = \frac{E'(p \cdot b - b - Emax) - p \cdot a \cdot b}{E'(p-1) - p \cdot a} \quad (8)$$

Otherwise, the electrical signal intensity E corresponding to the input optical signal may be calculated through the following formula:

$$E = (E'/r)^2 \quad (9)$$

Where, a and b denote preset control parameters, and their values are 0.17883277 and 0.28466892, respectively; and r denotes a reference value of the electrical signal. Optionally, the destination end sets the value of r to 0.5.

In S4, the destination end corrects the transferred optical signal intensity.

Optionally, in the embodiment, the destination end determines the gamma correction parameter through a relevant HLG method, and performs gamma correction on the transferred optical signal intensity.

Optionally, in the embodiment, the destination end sends the optical signal intensity processed by the gamma correction to the display device for display.

Third Embodiment

In the embodiment, a media data processing apparatus is also provided, which is used to implement the above embodiments and preferred implementations, and redundant description will not been repeated. As used below, the term "module" may implement a combination of software and/or hardware of a predetermined function. Although the devices described in the following embodiments are preferably implemented in software, hardware or a combination of software and hardware are also possible and contemplated.

Figure 4:
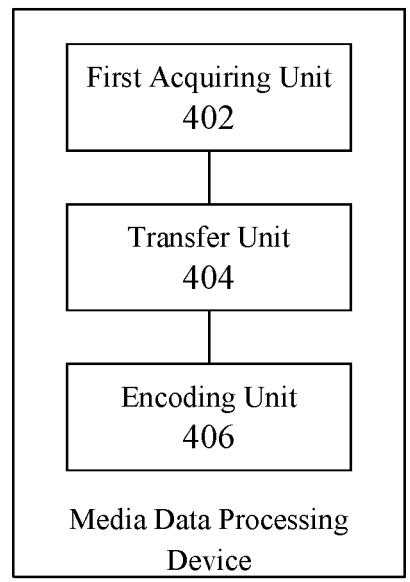
FIG. 4 is a block diagram of an alternative media data processing apparatus according to an embodiment of the present disclosure.

FIG. 4 is a block diagram of an alternative media data processing apparatus according to an embodiment of the present disclosure. As shown in FIG. 4, the device includes:

1) A first acquiring unit 402 configured to obtain an optical signal of a sampling point by a collection device at the source end in an acquisition of media data;
2) a transfer unit 404 configured to perform opto-electronic transfer on the optical signal of the sampling point according to an opto-electronic transfer control parameter, to obtain a transferred electrical signal, wherein the opto-electronic transfer control parameter is determined according to an optical signal intensity of the optical signal of the sampling point; and
3) an encoding unit 406 configured to encode the electrical signal and the opto-electronic transfer control parameter to obtain a bitstream.

Optionally, in the embodiment, the media data processing apparatus may be, but not limited to, applied to a system for processing media data. The system includes: a source-side collecting device and a display device at destination end. Taking a video communication application as an example, the above mentioned device may be, but not limited to, a related code-stream generating device and a receiving-playing device in a video communication application, such as, a mobile phone, a computer, a server, a set top box, a portable mobile terminal, a digital camera, a television broadcasting system device, etc. It is assumed that the code-stream generating device (source-side collecting device) shown in FIG. 2 may be a mobile phone 202, and the receiving-playing device (the display device at destination end) may be a computer 204. The above is only an example, and is not limited in the embodiment.

It should be noted that, in the embodiment, the source-side collecting device acquires the collected optical signal of the sampling point, and performs opto-electronic transfer on the optical signal of the sampling point according to the opto-electronic transfer control parameter to obtain the transferred electrical signal. The opto-electronic transfer control parameter is determined according to an optical signal intensity of the optical signal of the sampling point. Further, the electrical signal and the opto-electronic transfer control parameter are encoded to obtain a bitstream. That is, by encoding the opto-electronic transfer control parameter determined according to the optical signal intensity of the optical signal of the sampling point into the bitstream, it can adaptively adjust the opto-electronic transfer control parameter for performing opto-electronic transfer in consideration of the optical signal intensity. Thus, it can adaptively adjust the conversion curves for the collected media data (such as videos or images) with optical signals of the sampling points in different light intensity regions. It can effectively maintain details information of the media data before and after the opto-electronic transfer, so as to achieve the effect of improving the accuracy in conversion and processing of the media data, and overcome the problem in the related art that the since the opto-electronic transfer is merely based on the brightness of the display device and the brightness of the ambient light, the accuracy of processing media data is low.

Optionally, in the embodiment, obtaining an optical signal of a sampling point by a collection device at the source end in an acquisition of media data may be but not limited to: obtaining an optical signal of a sampling point by a collection device at the source end in an acquisition of media data. The optical signal intensity of the optical signal of the sampling point may be, but not limited to, represented by a voltage value in proportional to the light intensity of the light collected by the source-side collecting device. The optical signal intensity of the optical signal of the above sampling point may be, but not limited to, normalized with respect to a reference level (e.g., a reference white level).

It should be noted that the process of acquiring the voltage value may be the same as the process of acquiring the voltage value E in the related art (the scheme using the HLG conversion parameter), which will not be described herein in the embodiment.

Optionally, in the embodiment, performing opto-electronic transfer on the optical signal of the sampling point according to an opto-electronic transfer control parameter, to obtain a transferred electrical signal includes the following steps.

In S1, it is determined whether the optical signal intensity of the optical signal of the sampling point is greater than a predetermined threshold.

In S2, when the optical signal intensity of the optical signal of the sampling point is greater than the predetermined threshold, opto-electronic transfer is performed on the optical signal intensity of the optical signal of the sampling point according to the opto-electronic transfer control parameter, to obtain an electrical signal intensity of the electrical signal corresponding to the optical signal intensity of the optical signal of the sampling point.

It should be noted that, in the embodiment, when the optical signal intensity of the optical signal of the sampling point is greater than the predetermined threshold, the opto-electronic transfer control parameter associated with the optical signal intensity of the optical signal of the sampling point is introduced. Thus, the brightness range feature of the sampling point is taken into consideration in the opto-electronic transfer process. In this way, when the media data is converted, the conversion curve can be dynamically adaptively adjusted with different brightness range features, thereby achieving an accurate conversion effect on the media data.

Optionally, in the embodiment, performing opto-electronic transfer on the optical signal intensity of the optical signal of the sampling point according to the opto-electronic transfer control parameter, to obtain an electrical signal intensity of an electrical signal corresponding to the optical signal intensity of the optical signal of the sampling point, includes:

$$E' = a \frac{p(E-b)}{p(E-b) - (E-b) + E_{max}} \quad (1)$$

Where, E' denotes the electrical signal intensity of the electrical signal corresponding to the optical signal intensity of the optical signal of the sampling point; E denotes the optical signal intensity of the optical signal of the sampling point; p denotes the opto-electronic transfer control parameter; $E_{max}$ denotes the maximum brightness of the reference point; a and b denote preset control parameters.

That is to say, in the opto-electronic transfer process at the source side, an opto-electronic transfer function (such as formula (1)) is determined using a rational function curve having a similar characteristic to a logarithmic mapping curve. The opto-electronic transfer function includes the above opto-electronic transfer control parameter p. Opto-electronic transfer is performed on the optical signal of the sampling point having the optical signal intensity through the opto-electronic transfer function containing the above opto-electronic transfer control parameter p, to obtain an electrical signal with a corresponding electrical signal intensity. The electrical signal intensity of the electrical signal obtained herein can accurately reflect the details information of the media data in different light intensity regions, thereby achieving the effect of improving the accuracy of the media data conversion processing. In addition, in the embodiment, the opto-electronic transfer function may be a rational function, and compared with complex logarithmic and exponential operation required when using the HLG conversion function in the related art, performing opto-electronic transfer through a rational function can greatly reduce the overall computational complexity of the conversion process, and can also achieve the effect of improving the accuracy of data processing.

In addition, when the optical signal intensity of the optical signal of the sampling point is less than or equal to a predetermined threshold, the opto-electronic transfer may be performed with, but not limited to, the opto-electronic transfer mode provided in the related art (e.g. the scheme using the HLG conversion parameter).

$$E' = r\sqrt{E} \quad (2)$$

Where r is a reference value. Optionally, the value of r may be, but not limited to, set to 0.5 at the source side.

Optionally, in the embodiment, before performing opto-electronic transfer on the optical signal of the sampling point according to the opto-electronic transfer control parameter, the method further includes: an optical signal intensity of the optical signal of the sampling point and a display brightness of the display device at destination end are acquired; and the opto-electronic transfer control parameter is determined according to the optical signal intensity of the optical signal of the sampling point and the display brightness.

Optionally, in the embodiment, determining the opto-electronic transfer control parameter according to the optical signal intensity of the optical signal of the sampling point and the display brightness may be, but not limited to, determining the opto-electronic transfer control parameter according to the maximum optical signal intensity and the minimum optical signal intensity of the optical signal intensities of the obtained optical signals of the sampling point and the maximum brightness and the minimum brightness displayed by the display device at destination end.

For example, the opto-electronic transfer control parameter may be calculated by:

$$p = \frac{M}{N} \cdot \frac{H}{L} \quad (3)$$

Where, p denotes the opto-electronic transfer control parameter; M denotes the maximum brightness of the display device at destination end; N denotes the minimum brightness of the display device at destination end; H denotes the maximum optical signal intensity; and L denotes the minimum optical signal intensity.

Optionally, in the embodiment, the maximum optical signal intensity and the minimum optical signal intensity may be, but are not limited to, among the optical signal intensities of the obtained optical signals of the sampling points in one picture, the maximum optical signal intensity and the minimum optical signal intensity, or the maximum optical signal intensity and the minimum optical signal intensity in a plurality of pictures.

Optionally, in the embodiment, the maximum brightness and the minimum brightness of the display device at destination end may be, but are not limited to, the maximum brightness and the minimum brightness preset for the display device at destination end, or the maximum brightness and the minimum brightness achieved by the display device at destination end, which are acquired by the source side through communication with the destination end.

Optionally, in the embodiment, encoding the electrical signal and the opto-electronic transfer control parameter to obtain a bitstream includes the following steps.

In S1, a quantized value obtained by quantizing the electrical signal intensity of the electrical signal is encoded.

In S2, the opto-electronic transfer control parameter is encoded.

In S3, the quantified result and the bits obtained by encoding the opto-electronic transfer control parameter are written into the bitstream.

Writing the bits obtained by encoding the opto-electronic transfer control parameter into the bitstream include at least one of the following:

1) writing the bits obtained by encoding the opto-electronic transfer control parameter into a parameter set data unit of the bitstream;
2) writing the bits obtained by encoding the opto-electronic transfer control parameter into a supplemental enhancement information data unit of the bitstream; and
3) writing the bits obtained by encoding the opto-electronic transfer control parameter into a system layer data unit of the bitstream.

It should be noted that the above system layer data unit includes: a file format data unit and a descriptor unit. Writing the bits obtained by encoding the opto-electronic transfer control parameter into a system layer data unit of the bitstream may include: writing the bits obtained by encoding the opto-electronic transfer control parameter into a file format data unit and/or a descriptor unit in the system layer data unit.

Optionally, in the embodiment, after the bits obtained by encoding the opto-electronic transfer control parameter are written into the bitstream, the method further includes: establishing an association relationship between the data unit in the bitstream in which the bits obtained by encoding the opto-electronic transfer control parameter are written and an access unit in the bitstream.

In the embodiment, establishing an association relationship between the data unit in the bitstream in which the bits obtained by encoding the opto-electronic transfer control parameter are written and an access unit in the bitstream includes at least one of the following:

1) referencing to a parameter set data unit in the access unit;
2) writing the supplementary enhanced information data unit into the access unit; and
3) associating the system layer data unit with the access unit.

It should be noted that, in the above manner 3), associating the system layer data unit with the access unit includes at least one of the following: (1) indicating the access unit associated with the system layer data unit with a pointer parameter; and (2) writing the system layer data unit into header information of the system layer data unit where the access unit is located.

According to the embodiment provided by the present application, the collected optical signal of the sampling point is acquired, and opto-electronic transfer is performed on the optical signal of the sampling point according to the opto-electronic transfer control parameter to obtain the transferred electrical signal. The opto-electronic transfer control parameter is determined according to an optical signal intensity of the optical signal of the sampling point. Further, the electrical signal and the opto-electronic transfer control parameter are encoded to obtain a bitstream. That is, by encoding the opto-electronic transfer control parameter determined according to the optical signal intensity of the optical signal of the sampling point into the bitstream, it can adaptively adjust the opto-electronic transfer control parameter for performing opto-electronic transfer in consideration of the optical signal intensity. Thus, it can adaptively adjust the conversion curves for the collected media data (such as videos or images) with optical signals of the sampling points in different light intensity regions. It can effectively maintain details information of the media data before and after the opto-electronic transfer, so as to achieve the effect of improving the accuracy in conversion and processing of the media data, and overcome the problem in the related art that the since the opto-electronic transfer is merely based on the brightness of the display device and the brightness of the ambient light, the accuracy of processing media data is low.

As an optional solution, the transfer unit 404 includes:

1) a deciding module configured to determine whether the optical signal intensity of the optical signal of the sampling point is greater than a predetermined threshold; and
2) a converting module configured to, when the optical signal intensity of the optical signal of the sampling point is greater than the predetermined threshold, perform opto-electronic transfer on the optical signal intensity of the optical signal of the sampling point according to the opto-electronic transfer control parameter, to obtain an electrical signal intensity of the electrical signal corresponding to the optical signal intensity of the optical signal of the sampling point.

Optionally, in the embodiment, the optical signal intensity of the optical signal of the sampling point may be, but not limited to, represented by a voltage value E in proportional to the light intensity collected by the source-side collecting device. That is to say, the voltage value E is in proportional to the light intensity received on the sensor on the collecting device, and is a result normalized with respect to a reference level (e.g., a reference white level).

Optionally, in the embodiment, if the predetermined threshold is 1, when the optical signal intensity E of the optical signal of the sampling point is greater than 1, the converting module performs opto-electronic transfer on the optical signal intensity of the optical signal of the sampling point according to the opto-electronic transfer control parameter by:

$$E' = a \frac{p(E-b)}{p(E-b) - (E-b) + E_{max}} \quad (4)$$

Where, $E'$ denotes the electrical signal intensity of the electrical signal corresponding to the optical signal intensity of the optical signal of the sampling point; $E$ denotes the optical signal intensity of the optical signal of the sampling point; $p$ denotes the opto-electronic transfer control parameter; $E_{max}$ denotes the maximum brightness of the reference point; $a$ and $b$ denote preset control parameters.

It should be noted that in the embodiment, the above Emax is also a voltage value, and the value of Emax may be, but not limited to, set to 12. The process of determining the value of Emax here may be, but not limited to, the same as the process in the related art (e.g. the scheme using the HLG conversion parameter), details of which are not described herein in the embodiment. In addition, in the embodiment, the values of the preset control parameters a and b may be, but are not limited to, 0.17883277 and 0.28466892, respectively.

Optionally, in the embodiment, if the predetermined threshold is 1, when the value of the optical signal intensity E of the optical signal of the sampling point is within the range [0, 1], the value of the electrical signal intensity may be, but not limited to, calculated by the following manner:

$$E' = r\sqrt{E} \quad (5)$$

Wherein r is a reference value. Optionally, the value of r may be set to 0.5 at the source side.

According to the embodiment provided by the present application, opto-electronic transfer is performed on the optical signal of the sampling point having the optical signal intensity through the opto-electronic transfer function containing the above opto-electronic transfer control parameter to obtain an electrical signal with a corresponding electrical signal intensity. The electrical signal intensity of the electrical signal obtained herein can accurately reflect the details information of the media data in different light intensity regions, thereby achieving the effect of improving the accuracy of the media data conversion processing.

As an optional solution, the device further includes:

1) a second acquiring unit configured to, before opto-electronic transfer is performed on the optical signal of the sampling point according to the opto-electronic transfer control parameter, acquire an optical signal intensity of the optical signal of the sampling point and a display brightness of the display device at destination end; and
2) a determining unit configured to determine the opto-electronic transfer control parameter according to the optical signal intensity of the optical signal of the sampling point and the display brightness.

Optionally, in the embodiment, the second acquiring unit includes:

1) a first acquiring module configured to acquire the maximum optical signal intensity and the minimum optical signal intensity of the optical signal intensities of the obtained optical signal of the sampling point; and 2) a second acquiring module configured to acquire the maximum brightness and the minimum brightness displayed by the display device at destination end.

Optionally, in the embodiment, the determining unit determines the opto-electronic transfer control parameter according to the optical signal intensity of the sampling point and the display brightness by:

$$p = \frac{M}{N} \cdot \frac{H}{L} \qquad (6)$$

Where, p denotes the opto-electronic transfer control parameter; M denotes the maximum brightness of the display device at destination end; N denotes the minimum brightness of the display device at destination end; H denotes the maximum optical signal intensity; and L denotes the minimum optical signal intensity.

According to the embodiment provided by the present application, the opto-electronic transfer control parameter for opto-electronic transfer is determined according to the optical signal intensity of the sampling point collected by the collecting device. In this way, it can adaptively adjust the conversion curves for different light intensity regions according to the optical signal intensities of the sampling points in the collected media data. It can effectively reflect details information before and after the opto-electronic transfer, so as to ensure the accuracy in conversion and processing of the media data.

As an optional solution, the encoding unit includes:
1) a first encoding module configured to encode a quantized value obtained by quantizing the electrical signal intensity of the electrical signal;
2) a second encoding module configured to encode the opto-electronic transfer control parameter; and
3) a writing module configured to write the quantified result and the bits obtained by encoding the opto-electronic transfer control parameter into the bitstream.

Optionally, in the embodiment, the writing module writes the bits obtained by encoding the opto-electronic transfer control parameter into the bitstream by:
(1) writing the bits obtained by encoding the opto-electronic transfer control parameter into a parameter set data unit of the bitstream;
(2) writing the bits obtained by encoding the opto-electronic transfer control parameter into a supplemental enhancement information data unit of the bitstream; and
(3) writing the bits obtained by encoding the opto-electronic transfer control parameter into a system layer data unit of the bitstream.

Optionally, in the embodiment, the writing module writes the bits obtained by encoding the opto-electronic transfer control parameter into a parameter set data unit of the bitstream by: writing the bits obtained by encoding the opto-electronic transfer control parameter into a file format data unit and/or a descriptor unit in the system layer data unit.

According to the embodiment provided by the present application, the bits obtained by encoding the opto-electronic transfer control parameter are written into different data units in the bitstream, so that the destination end can accurately perform the corresponding electro-optical transfer process after parsing the bitstream.

It should be noted that each of the above modules may be implemented by software or hardware. For the latter, the device may be implemented by, but not limited to, distributing the above modules all in the same processor; or, distributing the above modules among different processors in any combination.

Fourth Embodiment

In the embodiment, a media data processing apparatus is also provided, which is used to implement the above embodiments and preferred implementations, and redundant description will not been repeated. As used below, the term "module" may implement a combination of software and/or hardware of a predetermined function. Although the devices described in the following embodiments are preferably implemented in software, hardware or a combination of software and hardware are also possible and contemplated.

Figure 5:
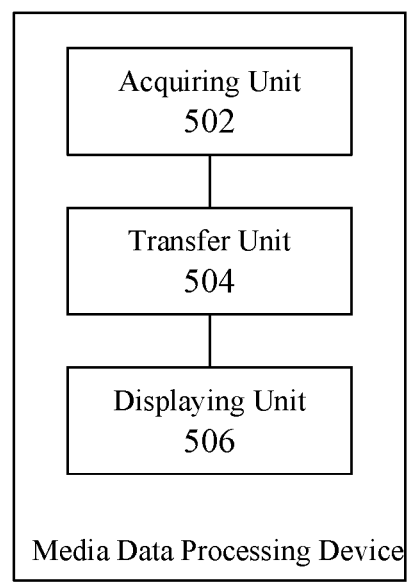
FIG. 5 is a block diagram of another alternative media data processing apparatus according to an embodiment of the present disclosure.

FIG. 5 is a block diagram of another alternative media data processing apparatus according to an embodiment of the present disclosure. As shown in FIG. 5, the device includes:
1) an acquiring unit 502 configured to parse a bitstream, and acquire an electrical signal to be processed and an electro-optical transfer control parameter;
2) a transfer unit 504 configured to perform electro-optical transfer on the electrical signal according to the electro-optical transfer control parameter, to obtain an optical signal intensity of the transferred optical signal; and
3) a displaying unit 506 configured to control the display device at destination end to display according to the optical signal intensity of the optical signal.

Optionally, in the embodiment, the above media data processing apparatus may be, but not limited to, applied to a system for processing media data. The system includes: a source-side collecting device and a display device at destination end. Taking a video communication application as an example, the above mentioned device may be, but not limited to, a related code-stream generating device and a receiving-playing device in a video communication application, such as, a mobile phone, a computer, a server, a set top box, a portable mobile terminal, a digital camera, a television broadcasting system device, etc. It is assumed that the code-stream generating device (source-side collecting device) shown in FIG. 2 may be a mobile phone 202, and the receiving-playing device (the display device at destination end) may be a computer 204. The above is only an example, and is not limited in the embodiment.

It should be noted that, in the embodiment, the display device at destination end parses the bitstream, acquires an electrical signal to be processed, and an electro-optical transfer control parameter; and performs electro-optical transfer on the electrical signal according to the electro-optical transfer control parameter to obtain an optical signal intensity of the transferred optical signal. Further, a display device at the destination end is controlled to display according to the optical signal intensity of the optical signal. That is to say, the bitstream is parsed at the destination end, and the electro-optical transfer control parameter for the electro-optical transfer process is obtained. Then electro-optical transfer is performed on the electric signal according to the electro-optical transfer control parameter to obtain the optical signal intensity of the transferred optical signal. By utilizing the electro-optical transfer control parameter corresponding to the opto-electronic transfer control parameter, it can adaptively adjust the conversion curves for the collected media data (such as videos or images) with optical signals of the sampling points in different light intensity regions. It can effectively maintain details information of the media data before and after the opto-electronic transfer, so as to achieve the effect of improving the accuracy in conversion and processing of the media data, and overcome the problem in the related art that the accuracy of processing media data is low.

Optionally, in the embodiment, the transfer unit includes:
(1) a deciding module configured to determine whether the electrical signal intensity of the electrical signal is greater than a predetermined threshold; and
(2) a converting module configured to, when the electrical signal intensity of the electrical signal is greater than the predetermined threshold, perform electro-optical transfer on the electrical signal intensity of the electrical signal with the electro-optical transfer control parameter to obtain an optical signal intensity of the optical signal corresponding to the electrical signal intensity of the electrical signal.

It should be noted that, in the embodiment, when the electrical signal intensity of the electrical signal is greater than the predetermined threshold, the electro-optical transfer control parameter is introduced. Thus, the conversion curve may be adaptively adjusted dynamically with the change of the brightness range feature, thereby achieving an accurate conversion effect on the media data.

Optionally, in the embodiment, the converting module performs electro-optical transfer on the electrical signal intensity of the electrical signal with the electro-optical transfer control parameter to obtain an optical signal intensity of the optical signal corresponding to the electrical signal intensity of the electrical signal by:

$$E = \frac{E'(p \cdot b - b - E_{max}) - p \cdot a \cdot b}{E'(p-1) - p \cdot a} \quad (1)$$

Where, E denotes the optical signal intensity of the optical signal corresponding to the electrical signal intensity of the electrical signal; E' denotes the electrical signal intensity of the electrical signal; p denotes the electro-optical transfer control parameter; $E_{max}$ denotes the maximum brightness of the reference point; and a and b denotes preset control parameters.

That is to say, in the electro-optical transfer process at the destination end, an electric-optic conversion function (such as formula (1)) is determined using a rational function curve having a similar characteristic to a logarithmic mapping curve. The electric-optic conversion function includes the above electric-optic conversion control parameter p. Electric-optic conversion is performed with the above electric-optic conversion control parameter p, to obtain an optical signal with a corresponding optical signal intensity. The optical signal intensity of the optical signal obtained herein can accurately reflect the details information of the media data in different light intensity regions, thereby achieving the effect of improving the accuracy of the media data conversion processing. In addition, in the embodiment, the electric-optic conversion function may be a rational function, and compared with complex logarithmic and exponential operation required when using the HLG conversion function in the related art, performing electric-optic conversion through a rational function can greatly reduce the overall computational complexity of the conversion process, and can also achieve the effect of improving the accuracy of data processing.

In addition, when the electrical signal intensity of the electrical signal is less than or equal to a predetermined threshold, the opto-electronic transfer may be performed by an opto-electronic transfer method provided in the related art (a scheme using an HLG conversion parameter):

$$E = (E'/r)^2 \quad (2)$$

Wherein r is a reference value. Optionally, the value of r may be set to 0.5 at the source side.

Optionally, in the embodiment, the acquiring unit includes at least one of the following:
(1) a first acquiring module configured to acquire the electro-optical transfer control parameter signalled in the bitstream; and
(2) a second acquiring module configured to acquire the optical signal intensity of the optical signal carried in the electrical signal and the display brightness of the display device at destination end; and a determining module configured to determine the electro-optical transfer control parameter according to the optical signal intensity of the optical signal carried in the electrical signal and the display brightness of the display device at destination end.

That is to say, in the embodiment, the opto-electronic transfer control parameter written into the bitstream can be directly obtained as the electro-optical transfer control parameter, and the electro-optical transfer control parameter can also be determined according to the optical signal intensity of the optical signal carried in the electrical signal and the device display of the display device at destination end.

Optionally, in the embodiment, the first acquiring module includes at least one of the following:
(1) a first acquiring sub-module configured to acquire the electro-optical transfer control parameter signalled in the parameter set data unit in the bitstream;
(2) a second acquiring sub-module configured to acquire the electro-optical transfer control parameter signalled in the supplementary enhancement information data unit in the bitstream; and
(3) a third acquiring sub-module configured to acquire the electro-optical transfer control parameter signalled in the system layer data unit in the bitstream.

It should be noted that, in the embodiment, the electro-optical transfer control parameter signalled in the supplementary enhancement information data unit overwrites the electro-optical transfer control parameter signalled in the parameter set data unit and/or the electro-optical transfer control parameter signalled in the system layer data unit. The electro-optical transfer control parameter signalled in the parameter set data unit overwrites the electro-optical transfer control parameter signalled in the system layer data unit.

Optionally, in the embodiment, 1) the second acquiring module includes: (1) a first acquiring sub-module configured to acquire the maximum optical signal intensity and the minimum optical signal intensity carried in the electrical signal; and (2) a second acquiring sub-module configured to acquire acquiring the maximum brightness and the minimum brightness of the display device at destination end.

2) The determining module determines the electro-optical transfer control parameter according to the optical signal intensity of the optical signal carried in the electrical signal and the display brightness of the display device at destination end by:

$$p = \frac{M}{N} \cdot \frac{H}{L} \tag{3}$$

Where, p denotes the electro-optical transfer control parameter; M denotes the maximum brightness of the display device at destination end; N denotes the minimum brightness of the display device at destination end; H denotes the maximum optical signal intensity; and L denotes the minimum optical signal intensity.

Optionally, in the embodiment, before the display device at destination end is controlled to display according to the optical signal intensity of the optical signal, the method further includes: S1, performing gamma correction on the optical signal.

According to the embodiment provided by the present application, the bitstream is parsed, the electrical signal to be processed and the electro-optical transfer control parameter are acquired; and electro-optical transfer is performed on the electrical signal according to the electro-optical transfer control parameter, to obtain an optical signal intensity of the transferred optical signal. Further, a display device at the destination end is controlled to display according to the optical signal intensity of the optical signal. That is to say, the bitstream is parsed at the destination end, and the electro-optical transfer control parameter for the electro-optical transfer process is acquired. Then the electric signal is electro-optically converted according to the electro-optical transfer control parameter to obtain the optical signal intensity of the transferred optical signal. By utilizing the electro-optical transfer control parameter corresponding to the opto-electronic transfer control parameter, it can adaptively adjust the conversion curves for the collected media data (such as videos or images) with optical signals of the sampling points in different light intensity regions. It can effectively maintain details information of the media data before and after the opto-electronic transfer, so as to achieve the effect of improving the accuracy in conversion and processing of the media data, and overcome the problem in the related art that the accuracy of processing media data is low.

As an optional solution, the transfer unit includes:
(1) a deciding module configured to determine whether the electrical signal intensity of the electrical signal is greater than a predetermined threshold.
(2) a converting module configured to, when the electrical signal intensity of the electrical signal is greater than the predetermined threshold, perform electro-optical transfer on the electrical signal intensity of the electrical signal with the electro-optical transfer control parameter to obtain an optical signal intensity of the optical signal corresponding to the electrical signal intensity of the electrical signal.

Optionally, in the embodiment, it is assumed that the predetermined threshold is r, and the value of r at the destination end may be set to 0.5. Then, when the electrical signal intensity E' of the electrical signal is greater than r (r=0.5), the electrical signal intensity of the electrical signal is electro-optically converted with the electro-optical transfer control parameter, to obtain the optical signal intensity of the optical signal corresponding to the electrical signal intensity of the electrical signal:

$$E = \frac{E'(p \cdot b - b - E_{max}) - p \cdot a \cdot b}{E'(p-1) - p \cdot a} \tag{4}$$

Where, E denotes the optical signal intensity of the optical signal corresponding to the electrical signal intensity of the electrical signal; E' denotes the electrical signal intensity of the electrical signal; p denotes the electro-optical transfer control parameter; $E_{max}$ denotes the maximum brightness of the reference point; a and b denotes preset control parameters.

It should be noted that in the embodiment, the above Emax is also a voltage value, and the value of Emax may be, but not limited to, set to 12. The process of determining the value of Emax here may be, but not limited to, the same as the process in the related art (the scheme using the HLG conversion parameter), details of which will not be described herein in the embodiment. In addition, in the embodiment, the values of the preset control parameters a and b may be, but are not limited to, 0.17883277 and 0.28466892, respectively.

Optionally, in the embodiment, it is assumed that the predetermined threshold is r, and the value of r at the destination end may be set to 0.5. Then, when the electrical signal intensity E' of the electrical signal is less than or equal to r (r=0.5), the corresponding optical signal intensity may be calculated by:

$$E = (E'/r)^2 \tag{5}$$

According to the embodiment provided by the present application, the electrical signal intensity is electro-optically converted through an electro-optical transfer function including the electro-optical transfer control parameter to obtain an optical signal intensity of the corresponding optical signal. The optical signal intensity of the optical signal obtained herein can accurately reflect the details information of the media data in different light intensity regions, thereby achieving the effect of improving the accuracy of the media data conversion processing.

As an optional solution, the acquiring unit includes at least one of the following:
1) a first acquiring module configured to acquire the electro-optical transfer control parameter signalled in the bitstream;
2) a second acquiring module configured to acquire the optical signal intensity of the optical signal carried in the electrical signal and the display brightness of the display device at destination end; and a determining module configured to determine the electro-optical transfer control parameter according to the optical signal intensity of the optical signal carried in the electrical signal and the display brightness of the display device at destination end Optionally, in the embodiment, the first module includes at least one of the following:
1) a first acquiring sub-module configured to acquire the electro-optical transfer control parameter signalled in the parameter set data unit in the bitstream;
2) a second acquiring sub-module configured to acquire an electro-optical transfer control parameter signalled in the supplementary enhancement information data unit in the bitstream; and
3) a third acquiring sub-module configured to acquire the electro-optical transfer control parameter signalled in the system layer data unit in the bitstream.

Optionally, in the embodiment, the electro-optical transfer control parameter signalled in the supplementary enhancement information data unit overwrites the electro-optical transfer control parameter signalled in the parameter set data unit and/or the electro-optical transfer control parameter signalled in the system layer data unit. The electro-optical transfer control parameter signalled in the parameter set data unit overwrites the electro-optical transfer control parameter signalled in the system layer data unit.

Optionally, in the embodiment, 1) the second acquiring module includes: (1) a first acquiring sub-module configured to acquire the maximum optical signal intensity and the minimum optical signal intensity carried in the electrical signal; and (2) a second acquiring sub-module configured to acquire the maximum brightness and the minimum brightness of the display device at destination end.

Optionally, in the embodiment, the determining module determines the electro-optical transfer control parameter according to the optical signal intensity of the optical signal carried in the electrical signal and the display brightness of the display device at destination end by:

$$p = \frac{M}{N} \cdot \frac{H}{L} \qquad (6)$$

Where, p denotes the electro-optical transfer control parameter; M denotes the maximum brightness of the display device at destination end; N denotes the minimum brightness of the display device at destination end; H denotes the maximum optical signal intensity; and L denotes the minimum optical signal intensity.

According to the embodiment provided by the present application, the electro-optical transfer control parameter obtained after parsing the bitstream is used in the electro-optical transfer process, and the conversion curve of the different light intensity regions can be adaptively adjusted, so that the conversion process can accurately reflect the details of the information before and after the conversion, and, in turn, ensure the accuracy of the media data conversion process.

It should be noted that each of the above modules may be implemented by software or hardware. For the latter, the device may be implemented by, but not limited to, distributing the above modules all in the same processor; or, distributing the above modules among different processors in any combination.

Fifth Embodiment

An embodiment of the present disclosure also provides a system for processing media data. The system includes a source-side collecting device and a display device at destination end.

1) The source-side collecting device is configured to obtain an optical signal of a sampling point by a collection device at the source end in an acquisition of media data; perform opto-electronic transfer on the optical signal of the sampling point according to an opto-electronic transfer control parameter, to obtain a transferred electrical signal, the opto-electronic transfer control parameter being determined according to an optical signal intensity of the optical signal of the sampling point; and encode the electrical signal and the opto-electronic transfer control parameter to obtain a bitstream.
2) The display device at destination end is configured to parse a bitstream, and acquire an electrical signal to be processed and an electro-optical transfer control parameter; perform electro-optical transfer on the electrical signal according to the electro-optical transfer control parameter, to obtain an optical signal intensity of the transferred optical signal; and control the display device at destination end to display according to the optical signal intensity of the optical signal.

Optionally, in the embodiment, the above system may include, but not limited to, a source-side collecting device and a display device at destination end. Taking a video communication application as an example, the above mentioned device may be, but not limited to, a related code-stream generating device and a receiving-playing device in a video communication application, such as, a mobile phone, a computer, a server, a set top box, a portable mobile terminal, a digital camera, a television broadcasting system device, etc. It is assumed that the code-stream generating device (source-side collecting device) shown in FIG. 2 may be a mobile phone 202, and the receiving-playing device (the display device at destination end) may be a computer 204. The above is only an example, and is not limited in the embodiment.

The source-side collecting device may, but not limited to, use the implementation in the above First Embodiment, to process the input HDR video or image to generate an electrical signal intensity corresponding to the sampling point in the HDR video or image. Optionally, the source-side collecting device can further convert the intensity of the electrical signal to a binary digital signal and encode the digital signal. Optionally, the source-side collecting device may further include a collecting device for the HDR video or image.

The display device at destination end may, but not limited to, use the implementation of the above Second Embodiment to process the bitstream of the received HDR video or image to convert the HDR video or image into an optical signal intensity for display by the display module.

Sixth Embodiment

An embodiment of the present disclosure also provides a storage medium. Optionally, in the embodiment, the above storage medium may be configured to store program codes for performing the following steps.

In S1, an optical signal of a sampling point obtained by a collection device at the source end in an acquisition of media data is acquired.

In S2, opto-electronic transfer is performed on the optical signal of the sampling point according to an opto-electronic transfer control parameter, to obtain a transferred electrical signal, and the opto-electronic transfer control parameter is determined according to an optical signal intensity of the optical signal of the sampling point.

In S3, the electrical signal and the opto-electronic transfer control parameter are encoded to obtain a bitstream.

Optionally, the storage medium is further configured to store program codes for performing the following steps.

In S1, it is determined whether the optical signal intensity of the optical signal of the sampling point is greater than a predetermined threshold.

In S2, when the optical signal intensity of the optical signal of the sampling point is greater than the predetermined threshold, opto-electronic transfer is performed on the optical signal intensity of the optical signal of the sampling point according to the opto-electronic transfer control parameter, to obtain an electrical signal intensity of the electrical signal corresponding to the optical signal intensity of the optical signal of the sampling point.

Optionally, the storage medium is further configured to store program codes for performing the following steps:

$$E' = a\frac{p(E-b)}{p(E-b)-(E-b)+E_{max}}$$

Where, E' denotes the electrical signal intensity of the electrical signal corresponding to the optical signal intensity of the optical signal of the sampling point; E denotes the optical signal intensity of the optical signal of the sampling point; p denotes the opto-electronic transfer control parameter; $E_{max}$ denotes the maximum brightness of the reference point; a and b denote preset control parameters.

Optionally, in the embodiment, the above storage medium may include, but not limited to, a USB flash drive, a Read-Only Memory (ROM), a Random Access Memory (RAM), a mobile hard disk, a magnetic disc, a CD or a variety of media that can store program codes.

Optionally, the specific examples in the embodiment may refer to the examples described in the above embodiments and the alternative implementations, details of which will not be repeated herein.

It will be apparent to those skilled in the art that the various modules or steps of the present disclosure described above can be implemented by a general-purpose computing device, which can be centralized on a single computing device or distributed across a network of multiple computing devices. Optionally, they may be implemented by program codes executable by the computing device such that they may be stored in the storage device and executed by the computing device. In some cases, the steps shown or described may be performed in an order different from the order herein, or may be fabricated separately into individual integrated circuit modules, or a plurality of modules or steps thereof may be fabricated as a single integrated circuit module. Thus, the present disclosure is not limited to any specific combination of hardware and software.

The above description is only the preferred embodiment of the present disclosure, and is not intended to limit the present disclosure. For those skilled in the art, various modifications and changes can be made to the present disclosure. Any modifications, equivalent substitutions, improvements, etc. made within the spirit and scope of the present disclosure are intended to be included within the scope of the present disclosure.

INDUSTRIAL APPLICABILITY

In the embodiments of the present disclosure, the optical signal of the sampling point which is obtained during collection of the media data is acquired, and opto-electronic transfer is performed on the optical signal of the sampling point according to the opto-electronic transfer control parameter to obtain the transferred electrical signal. The opto-electronic transfer control parameter is determined according to an optical signal intensity of the optical signal of the sampling point. Further, the electrical signal and the opto-electronic transfer control parameter are encoded to obtain a bitstream. That is, by encoding the opto-electronic transfer control parameter determined according to the optical signal intensity of the optical signal of the sampling point into the bitstream, it can adaptively adjust the opto-electronic transfer control parameter for performing opto-electronic transfer in consideration of the optical signal intensity. Thus, it can adaptively adjust the conversion curves for the collected media data (such as videos or images) with optical signals of the sampling points in different light intensity regions. It can effectively maintain details information of the media data before and after the opto-electronic transfer, so as to achieve the effect of improving the accuracy in conversion and processing of the media data, and overcome the problem in the related art that the since the opto-electronic transfer is merely based on the brightness of the display device and the brightness of the ambient light, the accuracy of processing media data is low.

What is claimed is:

1. A method for processing media data, comprising:
obtaining an optical signal of a sampling point by a collection device at the source end in an acquisition of media data;
acquiring an optical signal intensity of the optical signal of the sampling point and a display brightness of a display device at destination end;
determining an opto-electronic transfer control parameter according to the optical signal intensity of the optical signal of the sampling point and the display brightness;
performing opto-electronic transfer on the optical signal of the sampling point according to the opto-electronic transfer control parameter to obtain a transferred electrical signal; and
encoding the electrical signal and the opto-electronic transfer control parameter to obtain a bitstream;
wherein acquiring the optical signal intensity of the optical signal of the sampling point and the display brightness of the display device at destination end comprises: acquiring a maximum optical signal intensity and a minimum optical signal intensity of optical signal intensities of optical signals of sampling points; and acquiring a maximum brightness and a minimum brightness of the display device at destination end; and
wherein determining the opto-electronic transfer control parameter according to the optical signal intensity of the optical signal of the sampling point and the display brightness of the display device at destination end comprises:

$$p = \frac{M}{N} \cdot \frac{H}{L},$$

wherein, p denotes the opto-electronic transfer control parameter; M denotes the maximum brightness of the display device at destination end; N denotes the minimum brightness of the display device at destination end; H denotes the maximum optical signal intensity; and L denotes the minimum optical signal intensity.

2. The method according to claim 1, wherein performing opto-electronic transfer on the optical signal of the sampling point according to the opto-electronic transfer control parameter to obtain the transferred electrical signal comprises:
determining that the optical signal intensity of the optical signal of the sampling point is greater than a predetermined threshold; and
in response to determining that the optical signal intensity of the optical signal of the sampling point is greater than the predetermined threshold, performing opto-electronic transfer on the optical signal intensity of the optical signal of the sampling point according to the opto-electronic transfer control parameter, to obtain an electrical signal intensity of the electrical signal corresponding to the optical signal intensity of the optical signal of the sampling point.

3. The method according to claim 2,
wherein acquiring the maximum optical signal intensity and the minimum optical signal intensity of the optical signal intensities of the obtained optical signal of the sampling point comprises at least one of:
acquiring, among the optical signal intensities of the obtained optical signals of the sampling points in one picture, the maximum optical signal intensity and the minimum optical signal intensity; and
acquiring, among the optical signal intensities of the obtained optical signals of the sampling points in a plurality of pictures, the maximum optical signal intensity and the minimum optical signal intensity.

4. The method according to claim 1, wherein acquiring the maximum brightness and the minimum brightness of the display device at destination end comprises at least one of:
acquiring the maximum brightness and the minimum brightness preset for the display device at destination end; and
acquiring the maximum brightness and the minimum brightness achieved by the display device at destination end through communication with the destination side.

5. The method according to claim 2, wherein encoding the electrical signal and the opto-electronic transfer control parameter to obtain the bitstream comprises:
encoding a quantized value obtained by quantizing the electrical signal intensity of the electrical signal;
encoding the opto-electronic transfer control parameter; and
writing bits obtained by encoding the quantized value and the opto-electronic transfer control parameter into the bitstream.

6. The method according to claim 5, wherein writing the bits obtained by encoding the opto-electronic transfer control parameter into the bitstream comprises at least one of:
writing the bits obtained by encoding the opto-electronic transfer control parameter into a parameter set data unit of the bitstream;
writing the bits obtained by encoding the opto-electronic transfer control parameter into a supplemental enhancement information data unit of the bitstream; and
writing the bits obtained by encoding the opto-electronic transfer control parameter into a system layer data unit of the bitstream.

7. The method according to claim 6, wherein writing the bits obtained by encoding the opto-electronic transfer control parameter into the system layer data unit of the bitstream comprises:
writing the bits obtained by encoding the opto-electronic transfer control parameter into a file format data unit and/or a descriptor unit in the system layer data unit.

8. The method according to claim 6, wherein after writing the bits obtained by encoding the opto-electronic transfer control parameter into the bitstream, the method further comprises:
establishing an association relationship between the data unit in the bitstream in which the bits obtained by encoding the opto-electronic transfer control parameter are written and an access unit in the bitstream.

9. The method according to claim 8, wherein establishing the association relationship between the data unit in the bitstream in which the bits obtained by encoding the opto-electronic transfer control parameter are written and an access unit in the bitstream comprises at least one of:
referencing to a parameter set data unit in the access unit;
writing the supplementary enhanced information data unit into the access unit; and
associating the system layer data unit with the access unit.

10. The method according to claim 9, wherein associating the system layer data unit with the access unit comprises:
indicating the access unit associated with the system layer data unit with a pointer parameter; and
writing the system layer data unit into header information of the system layer data unit where the access unit is located.

11. The method according to claim 2, wherein performing opto-electronic transfer on the optical signal intensity of the optical signal of the sampling point according to the opto-electronic transfer control parameter, to obtain the electrical signal intensity of the electrical signal corresponding to the optical signal intensity of the optical signal of the sampling point, comprises:

$$E' = a \frac{p(E-b)}{p(E-b) - (E-b) + E_{max}}$$

wherein, E' denotes the electrical signal intensity of the electrical signal corresponding to the optical signal intensity of the optical signal of the sampling point; E denotes the optical signal intensity of the optical signal of the sampling point; p denotes the opto-electronic transfer control parameter; $E_{max}$ denotes the maximum brightness of the reference point; a and b denote preset control parameters.

12. A media data processing apparatus, comprising:
a processor; and
a non-transitory computer-readable storage medium for storing instructions which, when executed by the processor, cause the processor to perform a method comprising:
obtaining an optical signal of a sampling point by a collection device at the source end in an acquisition of media data;
acquiring an optical signal intensity of the optical signal of the sampling point and a display brightness of a display device at destination end;
determining an opto-electronic transfer control parameter according to the optical signal intensity of the optical signal of the sampling point and the display brightness;
performing opto-electronic transfer on the optical signal of the sampling point according to the opto-electronic transfer control parameter to obtain a transferred electrical signal; and
encoding the electrical signal and the opto-electronic transfer control parameter to obtain a bitstream;
wherein acquiring the optical signal intensity of the optical signal of the sampling point and the display brightness of the display device at destination end comprises: acquiring a maximum optical signal intensity and a minimum optical signal intensity of optical signal intensities of optical signals of sampling points; and
acquiring a maximum brightness and a minimum brightness of the display device at destination end; and
wherein determining the opto-electronic transfer control parameter according to the optical signal intensity of the optical signal of the sampling point and the display brightness of the display device at destination end comprises:

$$p = \frac{M}{N} \cdot \frac{H}{L}$$

wherein, p denotes the opto-electronic transfer control parameter; M denotes the maximum brightness of the display device at destination end; N denotes the minimum brightness of the display device at destination end; H denotes the maximum optical signal intensity; and L denotes the minimum optical signal intensity.

13. The apparatus according to claim 12, wherein the method performed by the processor further comprises:
determining that the optical signal intensity of the optical signal of the sampling point is greater than a predetermined threshold; and
in response to determining that the optical signal intensity of the optical signal of the sampling point is greater than the predetermined threshold, performing opto-electronic transfer on the optical signal intensity of the optical signal of the sampling point according to the opto-electronic transfer control parameter, to obtain an electrical signal intensity of the electrical signal corresponding to the optical signal intensity of the optical signal of the sampling point.

14. The apparatus according to claim 13, wherein the method performed by the processor further comprises:
encoding a quantized value obtained by quantizing the electrical signal intensity of the electrical signal;
encoding the opto-electronic transfer control parameter; and
writing bits obtained by encoding the quantized value and the opto-electronic transfer control parameter into the bitstream.

15. The apparatus according to claim 14, wherein writing the bits obtained by encoding the opto-electronic transfer control parameter into the bitstream comprises at least one of:
writing the bits obtained by encoding the opto-electronic transfer control parameter into a parameter set data unit of the bitstream;
writing the bits obtained by encoding the opto-electronic transfer control parameter into a supplemental enhancement information data unit of the bitstream; and
writing the bits obtained by encoding the opto-electronic transfer control parameter into a system layer data unit of the bitstream.

16. The apparatus according to claim 15, wherein writing the bits obtained by encoding the opto-electronic transfer control parameter into the system layer data unit of the bitstream comprises:
writing the bits obtained by encoding the opto-electronic transfer control parameter into a file format data unit and/or a descriptor unit in the system layer data unit.

17. The apparatus according to claim 12, wherein performing opto-electronic transfer on the optical signal of the sampling point according to the opto-electronic transfer control parameter to obtain the transferred electrical signal comprises:
determining that the optical signal intensity of the optical signal of the sampling point is greater than a predetermined threshold; and
in response to determining that the optical signal intensity of the optical signal of the sampling point is greater than the predetermined threshold, performing opto-electronic transfer on the optical signal intensity of the optical signal of the sampling point according to the opto-electronic transfer control parameter, to obtain an electrical signal intensity of the electrical signal corresponding to the optical signal intensity of the optical signal of the sampling point.

18. The apparatus according to claim 17,
wherein acquiring the maximum optical signal intensity and the minimum optical signal intensity of the optical signal intensities of the obtained optical signal of the sampling point comprises at least one of:
acquiring, among the optical signal intensities of the obtained optical signals of the sampling points in one picture, the maximum optical signal intensity and the minimum optical signal intensity, and
acquiring, among the optical signal intensities of the obtained optical signals of the sampling points in a plurality of pictures, the maximum optical signal intensity and the minimum optical signal intensity.

19. The apparatus according to claim 12, wherein acquiring the maximum brightness and the minimum brightness of the display device at destination end comprises at least one of:
acquiring the maximum brightness and the minimum brightness preset for the display device at destination end; and
acquiring the maximum brightness and the minimum brightness achieved by the display device at destination end through communication with the destination side.

20. The apparatus according to claim 13, wherein performing opto-electronic transfer on the optical signal intensity of the optical signal of the sampling point according to the opto-electronic transfer control parameter, to obtain the electrical signal intensity of the electrical signal corresponding to the optical signal intensity of the optical signal of the sampling point, comprises:

$$E' = a \frac{p(E-b)}{p(E-b) - (E-b) + E_{max}}$$

wherein, E' denotes the electrical signal intensity of the electrical signal corresponding to the optical signal intensity of the optical signal of the sampling point; E denotes the optical signal intensity of the optical signal of the sampling point; p denotes the opto-electronic transfer control parameter; $E_{max}$ denotes the maximum brightness of the reference point; a and b denote preset control parameters.

* * * * *